United States Patent [19]
Tokumitsu

[11] Patent Number: 5,227,906
[45] Date of Patent: Jul. 13, 1993

[54] OPTICAL SWITCH ARRAY CAPABLE OF BIDIRECTIONAL SIGNAL TRANSFER BETWEEN A PLURALITY OF TERMINALS

[75] Inventor: Jun Tokumitsu, Sagamihara, Japan

[73] Assignee: Canon Kabushiki Kaisha, Tokyo, Japan

[21] Appl. No.: 490,442

[22] Filed: Mar. 8, 1990

[30] Foreign Application Priority Data

Mar. 9, 1989 [JP] Japan ................................. 1-55059
Mar. 9, 1989 [JP] Japan ................................. 1-55060

[51] Int. Cl.$^5$ ............................................ H04J 14/00
[52] U.S. Cl. .................................... 359/117; 359/139
[58] Field of Search ............... 359/117, 128, 138, 139, 359/164

[56] References Cited

U.S. PATENT DOCUMENTS

| | | | |
|---|---|---|---|
| 3,985,975 | 10/1976 | Steensma | 350/3.5 |
| 4,543,662 | 9/1985 | Huignard et al. | 359/117 |
| 4,707,743 | 11/1987 | Tokumitsu et al. | 358/213.13 |
| 4,740,061 | 4/1988 | Miura | 350/381 |
| 4,815,027 | 3/1989 | Tokumitsu et al. | 364/841 |
| 4,923,269 | 5/1990 | Healey | 350/96.15 |
| 4,927,230 | 5/1990 | Tokumitsu | 350/96.24 |
| 4,953,155 | 8/1990 | Tangonan | 359/117 |

FOREIGN PATENT DOCUMENTS

| | | |
|---|---|---|
| 0277779 | 8/1988 | European Pat. Off. |
| 0304043 | 2/1989 | European Pat. Off. |
| 2713079 | 10/1978 | Fed. Rep. of Germany |
| 61-191165 | 8/1986 | Japan |
| 1379648 | 1/1975 | United Kingdom |

OTHER PUBLICATIONS

IEEE Spectrum, "Optical Computing: A Field in Flux," Aug. 1986, pp. 34–57.

Primary Examiner—Edward L. Coles, Sr.
Assistant Examiner—L. Pascal
Attorney, Agent, or Firm—Fitzpatrick, Cella, Harper & Scinto

[57] ABSTRACT

An optical switch array is provided so as to connect a first group of M terminals capable of transmitting and receiving signals to and from a second group of N terminals, where M and N are respectively an integer of not less than 1.

The optical switch array comprises first and second light-emitting devices, first and second light-receiving devices and first and second shutter arrays.

The first and second light-emitting devices comprise M light sources driven in response to the signals input from the terminals of the first group and N light sources driven in response to the signals input from the terminals of the second group, respectively. The second light-emitting device is arranged in series with the first light-emitting device.

The first and second light-receiving devices are arranged in a direction perpendicular to a predetermined direction in which the first and second light-emitting devices are arranged. The first and second light-receiving devices comprise M photodetectors for outputting the signals to the terminals of the first group and N photodetectors for outputting the signals to the terminals of the second group, respectively.

The first and second shutter arrays are arranged in an optical path between the first light-emitting device and the second light receiving device and an optical path between the second light-emitting device and the first light-receiving device. The first and second shutter arrays each include at least one segment as a unit and each is constituted by a plurality of openable shutters arranged in units of segments when M×N segments arranged in a matrix form in the predetermined direction and the direction perpendicular to the predetermined direction are assumed.

48 Claims, 17 Drawing Sheets

SURFACE EMITTING TYPE LIGHT SOURCE

OPTICAL SWITCH ARRAY CAPABLE OF BIDIRECTIONAL SIGNAL TRANSFER BETWEEN A PLURALITY OF TERMINALS

BACKGROUND OF THE INVENTION

1. Field of the Invention

The present invention relates to an optical switch array used for mutual connections in a communication network or between parallel computers.

2. Related Background Art

A switch array is an indispensable element in the fields of communications and computer technologies, but it is not easy to manufacture a large switch array even if state-of-the-art semiconductor techniques are used. In particular, although a crossbar switch is desired in favor of its characteristics, only a switch of this type for connecting a small number of terminals is available since the number of switches is increased.

An attempt has been made to manufacture a large crossbar switch by utilizing optical techniques. An example is described in IEEE SPECTRUM, Trudy E. Bell, August issue, first column, 1986, pp. 34–57. FIG. 1 is a schematic view showing a conventional optical crossbar switch. Four light sources $1_1$ to $1_4$ are driven by independent terminals (not shown). Output light beams 2 from the light sources $1_1$ to $1_4$ respectively serve as transmission beams 4 passing through a shutter array 3. Four photodetectors $5_1$ to $5_4$ receive the transmission beams 4 and transmit signals which represent light-receiving states to independent terminals (not shown), respectively.

This example shows a 4×4 optical crossbar switch. Signals from the independent terminals are sent to the light sources $1_1$ to $1_4$. The output beams 2 from the light sources $1_1$ to $1_4$ are spread in a vertical direction, and the fan beam is incident on the shutter array 3. The transmission beams 4 passing through light-transmitting portions of the shutter array 3 which are indicated by hatched portions are converged in a horizontal direction, and focused beams are respectively incident on the photodetectors $5_1$ to $5_4$. The signals which represent the light-receiving states from the photodetectors $5_1$ to $5_4$ are sent to the independent terminals, respectively. The connecting states of the terminals are determined by the light-transmitting states of the shutters of the shutter array 3. For example, a beam from the light source $1_1$ is incident on the first column of the shutter array 3. In this case, when a shutter of the third row and the first column is set in a light-transmitting state, the beam is detected by the photodetector $5_3$. In this case, a terminal connected to the light source $1_1$ is connected to a terminal connected to the photodetector $5_3$. This can similarly apply to other terminals.

FIG. 2 is a block diagram of a network using a unidirectional switch array shown in FIG. 1. This network comprises transmission terminals $11_1$ to $11_4$, a unidirectional switch array 12, and four reception terminals $13_1$ to $13_4$. As indicated by arrows in FIG. 2, signals are sent from the transmission terminals $11_1$ to $11_4$ to the reception terminals $13_1$ to $13_4$ through the unidirectional switch array 12. Acknowledgement signals representing that the reception terminals received the signals, and data request signals are often required to be sent from the reception terminals $13_1$ to $13_4$ to the transmission terminals $11_1$ to $11_4$. With the above arrangement, however, reverse signal transfer cannot be performed.

FIG. 3 is a block diagram showing an arrangement of parallel computers using a unidirectional switch array. Four processors $21_1$ to $21_4$ are connected to each other through a unidirectional switch array 22. In this arrangement, the transmission terminal also serves as the reception terminal. Signals from the processors $21_1$ to $21_4$ are switched by the unidirectional switch array 22 and are selectively directed toward the processors $21_1$ to $21_4$. With this arrangement, it is possible to mutually transmit signals between the processors $21_1$ to $21_4$, but the mutual connecting capacity is degraded. Assume that a signal is sent from the processor $21_1$ to the processor $21_4$. The internal shutters of the unidirectional switch array 22 are so set as to send a signal from the processor $21_1$ to the processor $21_4$ by the unidirectional switch array 22. The unidirectional switch array 22 must reset the shutters so that a response signal such as an input data reception acknowledgement signal or the like is sent from the processor $21_4$ to the processor $21_1$. In this manner, the switches must be switched for the two processors so as to send signals between them.

A wasteful switching time is required, and an operation speed of the system is decreased, resulting in inconvenience. In addition, since switching must be performed in synchronism with the respective signals, control is cumbersome, and a control circuit is complicated.

A conventional bidirectional switch array arranged by using semiconductor elements is also known to those skilled in the art. FIG. 4 is a block diagram of a shared memory type parallel computers using such a bidirectional switch array. This computer system comprises four processors $31_1$ to $31_4$, a bidirectional switch array 32, and four memories $33_1$ to $33_4$. Any one of the processors $31_1$ to $31_4$ can access any one of the memories $33_1$ to $33_4$ through the bidirectional switch array 32. Signals sent from the processors $31_1$ to $31_4$ are typically address signals, and the memories $33_1$ to $33_4$ send back data signals to the processors $31_1$ to $31_4$ upon reception of the address signals.

The bidirectional switch array utilizing the semiconductor elements is, however, small and is not suitable for a system for performing signal transfer between a large number of terminals.

SUMMARY OF THE INVENTION

It is an object of the present invention to solve the conventional problems described above and to provide a switch array capable of performing bidirectional signal transfer between a large number of terminals.

In order to achieve the above object of the present invention, there is provided an optical switch array for connecting a first group of M (M is an integer of not less than 1) terminals capable of transmitting and receiving signals to and from a second group of N (N is an integer of not less than 1) terminals, comprising:

first light-emitting means arranged in a predetermined direction and consisting of M light sources driven in response to the signals input from the terminals of the first group;

second light-emitting means arranged in the predetermined direction and consisting of N light sources driven in response to signals input from the terminals of the second group, the second light-emitting means being arranged in series with the first light-emitting means;

first light-receiving means arranged in a direction perpendicular t the predetermined direction and consisting of M photodetectors for outputting the signals to the terminals of the first group;

second light-receiving means arranged in the direction perpendicular to the predetermined direction and consisting of N photodetectors for outputting the signals to the terminals of the second group, the second light-receiving means being arranged in series with the first light-receiving means;

a first shutter array arranged in an optical path extending from the first light-emitting means to the second light-receiving means, the first shutter array including at least one segment as a unit and being constituted by a plurality of openable shutters arranged in units of segments when M×N segments arranged in a matrix form in the predetermined direction and the direction perpendicular to the predetermined direction are assumed; and a second shutter array arranged in an optical path extending from the second light-emitting means to the first light-receiving means, the second shutter array including at least one segment as the unit and being constituted by a plurality of openable shutters arranged in units of segments when the M×N segments arranged in the matrix form in the predetermined direction and the direction perpendicular to the predetermined direction are assumed.

DETAILED DESCRIPTION OF THE PREFERRED EMBODIMENTS

Figure 5:
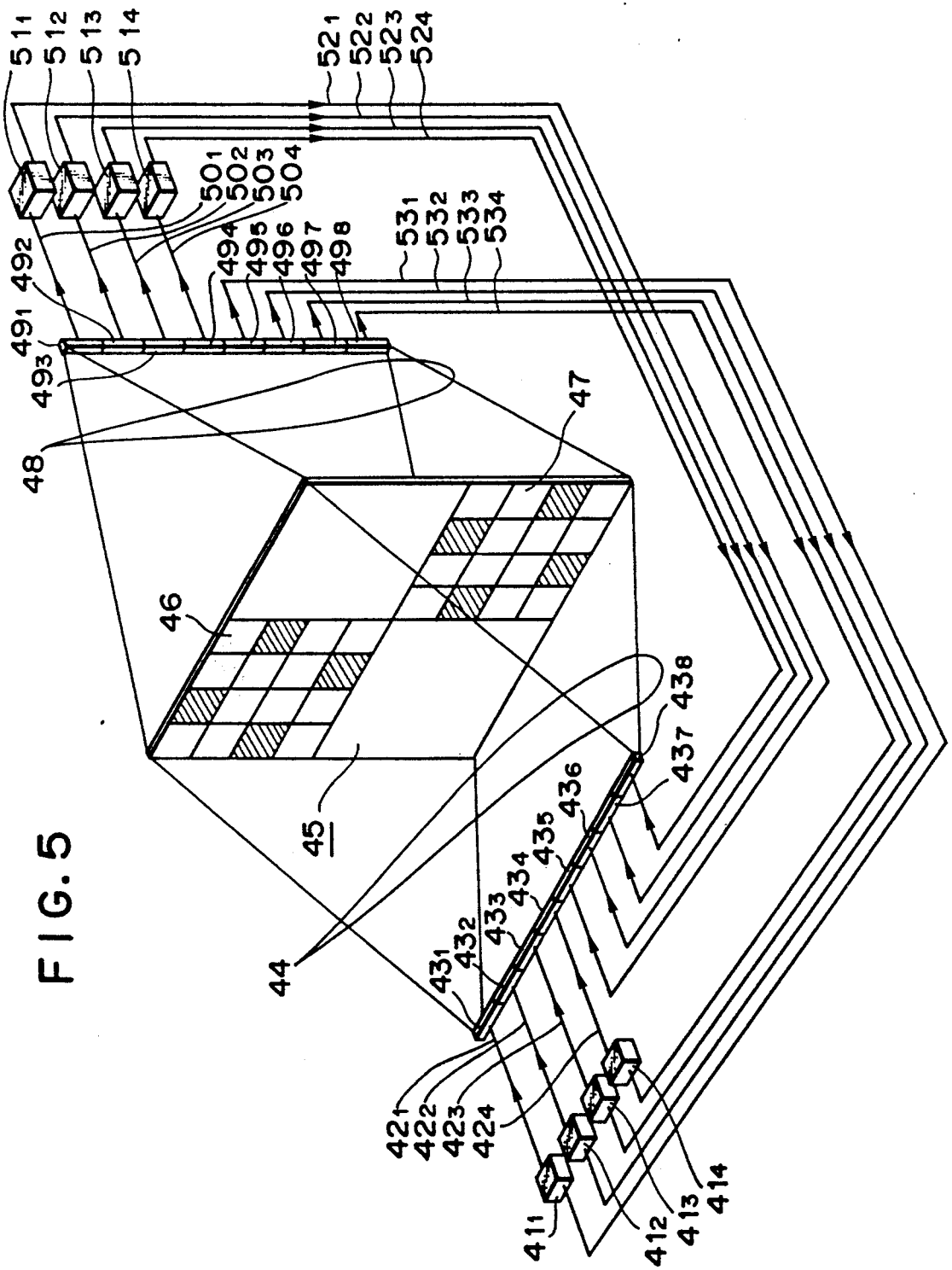
FIG. 5 is a schematic perspective view showing an optical switch array according to the first embodiment of the present invention.

FIG. 5 is a schematic view showing an arrangement of the first embodiment of the present invention.

In this embodiment, four terminals $41_1$ to $41_4$ of the first group are connected to four terminals $51_1$ to $51_4$ of the second group through a bidirectional optical switch array.

Figure 1:
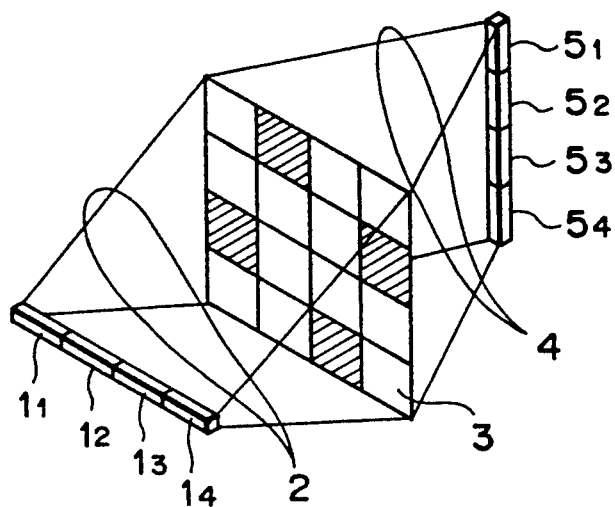
FIG. 1 is a schematic perspective view showing a conventional optical switch array.
Figure 2:
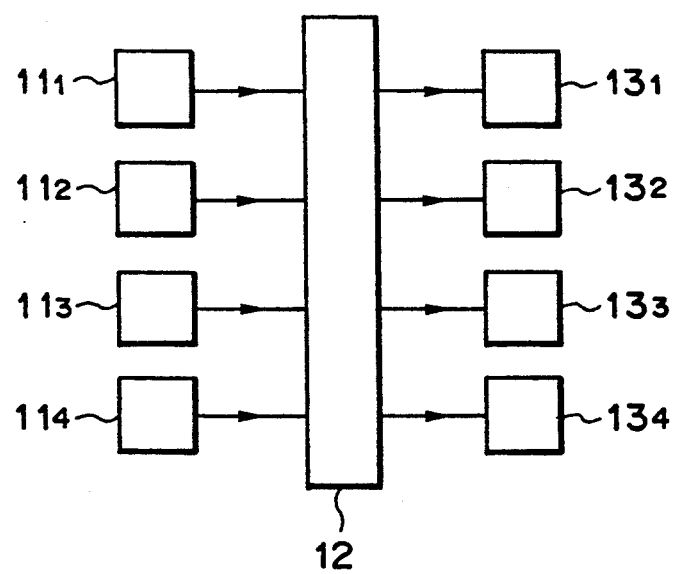
FIGS. 2 to 4 are block diagrams showing signal transmission systems using conventional switch arrays, respectively.
Figure 3:
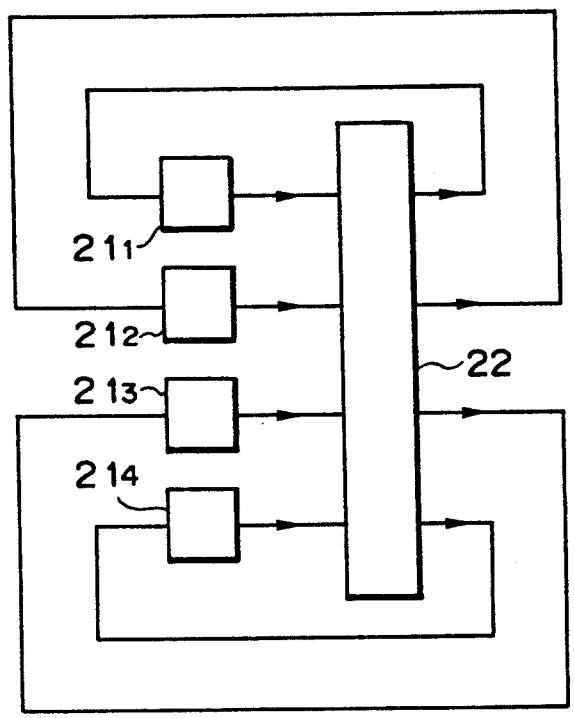
Figure 4:
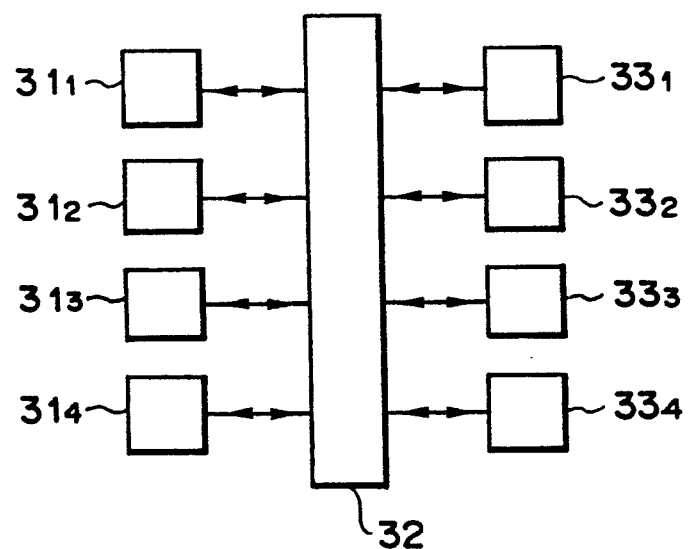

Eight series-connected light sources $43_1$ to $43_8$ are horizontally arranged, and eight series-connected photodetectors $49_1$ to $49_8$ are vertically arranged. These light sources $43_1$ to $43_8$ and these photodetectors $49_1$ to $49_8$ will be referred to as briefly "light sources $43_1$ to $43_8$" and "photodetectors $49_1$ to $49_8$" hereinafter. A shutter array 45 for limiting and shaping output beams 44 from the light sources $43_1$ to $43_8$ and outputting transmission beams 48 and an optical system (not shown) are arranged between the light sources $43_1$ to $43_8$ and the photodetectors $49_1$ to $49_8$ in the same manner as in the conventional example shown in FIG. 1. The terminals $41_1$ to $41_4$ output input signals $42_1$ to $42_4$ to the four light sources $43_1$ to $43_4$, control light-emitting operations of the light sources $43_1$ to $43_4$, and receive output signals $53_1$ to $53_4$ representing light-receiving states from the four photodetectors $49_5$ to $49_8$. The terminals $51_1$ to $51_4$ of the second group output input signals $52_1$ to $52_4$ to the four light sources $43_5$ to $43_8$, control the light-emitting operations of the light sources $43_1$ to $43_4$, and receive output signals $50_1$ to $50_4$ representing the light-receiving states, from the photodetectors $49_1$ to $49_4$.

In this embodiment, the light sources $43_1$ to $43_8$ are arranged from the left to the right and the photodetectors $49_1$ to $49_8$ are arranged downward when the shutter array 45 is viewed from the terminals $41_1$ to $41_4$.

The shutter array 45 of this embodiment comprises a combination of a 4×4 first shutter array 46 and a second shutter array 47 to distribute the output beams 44 from the eight light sources $43_1$ to $43_8$ to the eight photodetectors $47_1$ to $47_8$. The first shutter array 46 is arranged to distribute the output beams from the light sources $43_1$ to $43_4$ to the photodetectors $49_1$ to $49_4$, and the second shutter array 47 is arranged to distribute the output beams from the light sources $43_5$ to $43_8$ to the photodetectors $49_5$ to $49_8$. As shown in FIG. 5, the output beams 44 are spread vertically, and the transmission beams 48 are focused in the horizontal direction. The first shutter array 46 is located at the upper left portion and the second shutter array 47 is located at the lower right portion when the shutter array 45 is viewed from the terminals $41_1$ to $41_4$. A spatial optical modulator using an electro-optical material such as a liquid crystal, PLZT, or LiNbO$_3$, a spatial optical modulator using a magneto-optical material such as Bi-substituted YIG, or a spatial optical modulator using a semiconductor material such as GaAs can be used to form the first and second shutter arrays 46 and 47 in the shutter array 45. Alternatively, a display for controlling transmittance, such as an electrochromic display can be used. Light-emitting diodes (LEDs) or semiconductor lasers may be used as the light sources $43_1$ to $43_8$.

An operation of this embodiment will be described below.

The light sources $43_1$ to $43_4$ are driven in response to the signals $42_1$ to $42_4$ from the terminals $41_1$ to $41_4$, respectively. The output beams 44 serve as fan beams obtained by spreading the output beams from the light sources $43_1$ to $43_4$ in the vertical direction. The output beams 44 are incident on the shutter array 45 and pass through light-transmitting shutters in the first and second shutter arrays 46 and 47. The light-transmitting portions of the shutter array 45 are represented by hatched portions, respectively. The light beams from the light sources $43_1$ to $43_4$ are incident on the first shutter array 46. The beams 48 having passed through the shutter array 45 are focused in only the horizontal direction and are respectively incident on the photodetectors $49_1$ to $49_8$.

In the light-transmitting state (FIG. 5) of the first shutter array 46, the beams output from the light sources $43_1$ to $43_4$ are detected by the photodetectors $49_3$, $49_1$, $49_4$, and $49_2$, respectively. For example, a beam emerging from the light source $43_1$ is vertically spread, passes through the light-transmitting portion of the third row and the first column of the first shutter array 46, is focused in the horizontal direction, and is then incident on the photodetector $49_3$. Similar operations are performed for other light sources and other photodetectors. The output signals $50_1$ to $50_4$ from the photodetectors $49_1$ to $49_4$ are sent to the terminals $51_1$ to $51_4$ of the second group. That is, the terminals $41_1$ to $41_4$ of the first group send signals to the terminals $51_3$, $51_1$, $51_4$, and $51_2$, respectively. As previously described, the terminals of the second group must send reception acknowledgement signals or the like to the terminals of the first group. The input signals $52_1$ to $52_4$ from the terminals of the second group are input to the light sources $43_5$ to $43_8$ and drive them, respectively. Beam from the light sources $43_5$ to $43_8$ are spread in only the vertical direction and are incident on the second shutter array 47 in the shutter array 45. The light-transmitting portions of the second shutter array 47 are obtained by changing the rows to columns and vice versa of the first shutter array 46. When the light-transmitting portion of the first shutter array 46 is a shutter of the third row and the first column, the light-transmitting portion of the second shutter array 47 is a shutter of the first row and the third column. In general, when a light-transmitting portion of the first shutter array 46 is a shutter of the ith row and jth column, a light-transmitting portion of the second shutter array 47 is a shutter of the jth row and the ith column. The beams from the light sources $43_5$ to $43_8$ are detected by the photodetectors $49_6$, $49_8$, $49_5$, and $49_7$, respectively, as shown in FIG. 5. For example, since the beam from the light source $43_5$ passes through the shutter of the second row and the first column of the second shutter array 47, the beam is detected by the photodetector $49_6$. This can apply to other light sources and other photodetectors. The output signals $53_1$ to $53_4$ from the photodetectors $49_5$ to $49_8$ are sent to the terminals $41_1$ to $41_4$ of the first group. As a result, the signals from the terminals $51_1$ to $51_2$, $51_3$, and $51_4$ of the second group are sent to the terminals $41_2$, $41_4$, $41_1$, and $41_3$ of the second group, respectively. Bidirectional transmission between the terminals of the first and second groups can be performed by pairs of $(41_1,51_3)$, $(41_2,51_1)$, $(41_3,51_4)$, and $(41_4,51_2)$. In order to change the transmission pairs, the light-transmitting portions of the first and second shutter arrays 46 and 47 are changed. Since the first and second shutter arrays 46 and 47 are staggered within the shutter array 45 in the vertical and horizontal directions, no crosstalk of transmission signals in the vertical and horizontal directions occurs.

The light sources $43_1$ to $43_8$ and the photodetectors $49_1$ to $49_8$ are freely arranged. In summary, a desired terminal pair is adjusted together with the light-transmitting portions of the shutter array 45 so as to allow bidirectional transmission.

An optical system for optically coupling the respective members has not yet been described in detail in the above embodiment. This optical system will be described in detail below.

Figure 6:
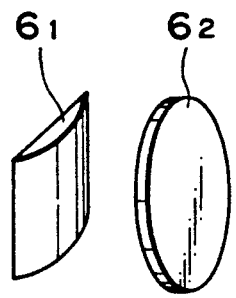
FIGS. 6 and 7 are respectively perspective views showing arrangements of optical systems used in the first embodiment of the present invention.
Figure 7:
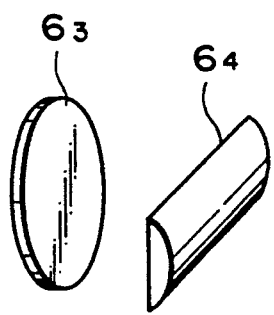

FIGS. 6 and 7 are schematic views showing first and second anamorphic optical systems. The first anamorphic optical system comprises a first cylindrical lens $6_1$ and a first spherical lens $6_2$. The second anamorphic optical system comprises a second spherical lens $6_3$ and a second cylindrical lens $6_4$. The first anamorphic optical system constituted by the first cylindrical lens $6_1$ and the first spherical lens $6_2$ focuses a beam in the horizontal direction and spreads the beam in the vertical direction. To the contrary, the second anamorphic optical system constituted by the second spherical lens $6_3$ and the second cylindrical lens $6_4$ spreads the beam in the horizontal direction and focuses it in the vertical direction. As shown in FIG. 5, the first anamorphic optical system is inserted between the shutter array 45 and the light sources $43_1$ to $43_8$, and the second anamorphic optical system is inserted between the shutter array 45 and the photodetectors $49_1$ to $49_8$ to perform the desired operation. The light sources $43_1$ to $43_8$ are located to have a conjugate relationship with the shutter array 45 in the horizontal direction. The light sources $43_1$ to $43_8$ are located almost at the front focal plane of the first anamorphic optical system in the vertical direction. Similarly, the shutter array 45 is located to have a conjugate relationship with the photodetectors $49_1$ to $49_8$ in the vertical direction, and the shutter array 45 is located almost the front focal plane of the second anamorphic optical system in the horizontal direction. An inverted image is formed in this focusing operation. The positions of the beams 44 incident on the shutter array 45 upon emergence of the beams from the light sources $43_1$ to $43_8$ are changed from those as described above. A change in position is not an essential problem. An order of signal lines or an order of drive signals input to the shutter array 45 are changed to cope with the change in position. This applies to the second anamorphic optical system, and a total connecting relationship of the signal lines is taken into consideration.

In the second anamorphic optical system, the beams 48 having passed through the shutter array 45 are not focused in the horizontal direction due to the following reason. The beams are spread in the horizontal direction, and the photodetectors $49_1$ to $49_8$ can receive beams from all the light-transmitting portions of the corresponding rows in the first or second shutter array 46 or 47. The operation described above can thus be performed.

Fibers may be used in place of the lens. For example, the fibers are connected such that the beam emitted from the light source $43_1$ is directly incident on a fiber bundle and the exit end of the fiber bundle radiates it onto the first column of the first shutter array 46 of the shutter array 45. This applies to other light sources $43_2$ to $43_8$. The exit ends of the fibers aligned along the first row are directed toward the photodetectors $49_1$ behind the shutter array 45. Similarly, the fibers are aligned in the second and subsequent rows of the shutter array 45 with respect to the photodetectors $49_2$ to $49_8$, and the exit ends are thus guided toward the corresponding photodetectors.

Optical transmission using such a fiber bundle is described in U.S. Pat. No. 4,815,027.

Figure 8:
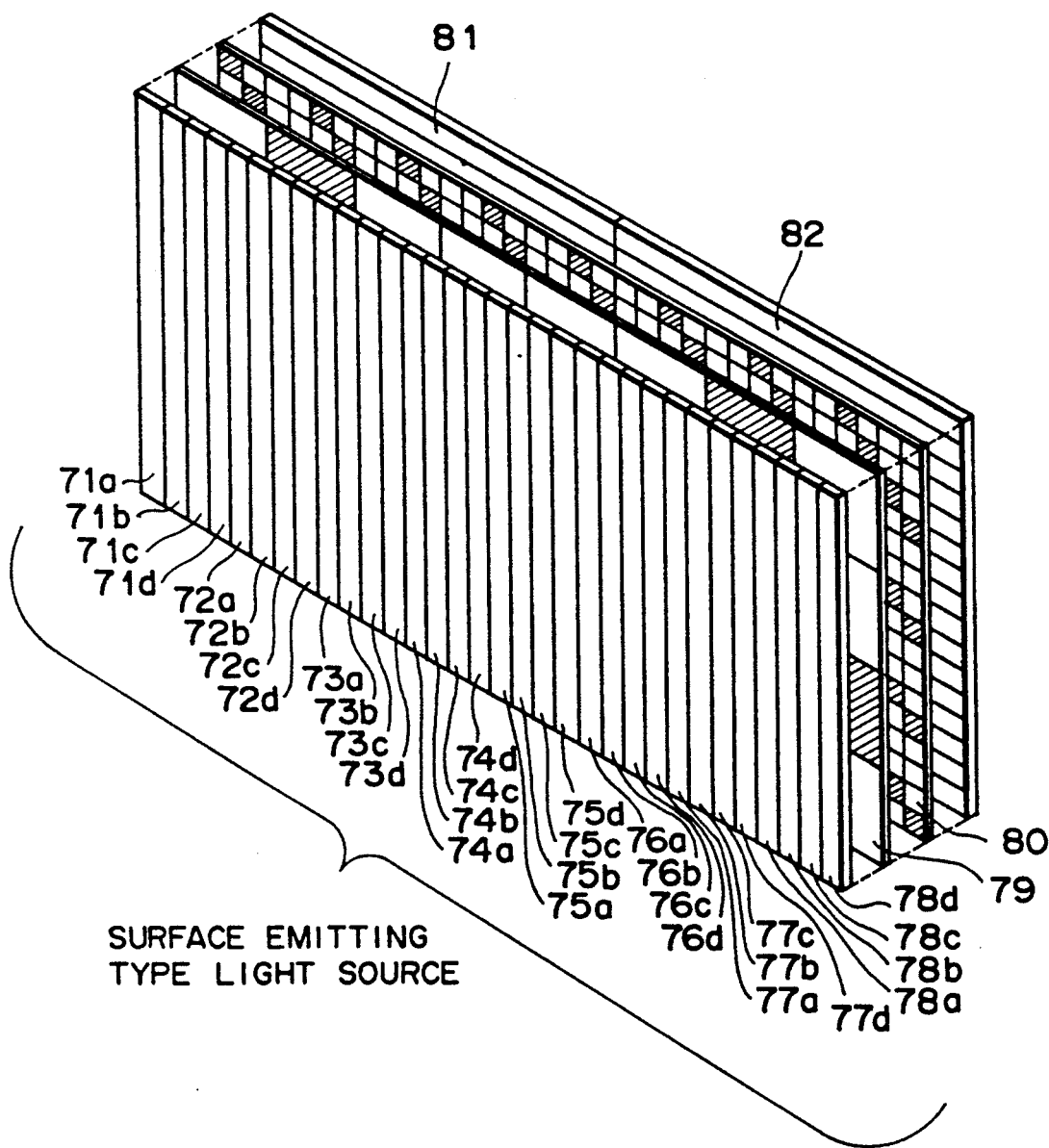
FIG. 8 is a perspective view showing a main part of the second embodiment of the present invention.

FIG. 8 is a perspective view showing a main part of the second embodiment of the present invention. This optical switch array includes surface emitting type light sources 71a, 71b to 78c, and 78d. A shutter array 79 is divided into right and left arrays with respect to the central line. The left shutter array is the same as the first shutter array 46 in FIG. 1, and the right shutter array is the same as the second shutter array 47 in FIG. 5. The patterns of the light-transmitting portions are the same as those in FIG. 5. A mask 80 has a large number of openings on the entire surface. The holes of this mask 80 can be formed by mechanical boring or by a photolithographic technique upon deposition of Al or Cr on a glass substrate. Hatched portions represent beam light-transmitting portions of the mask 80.

Figure 9:
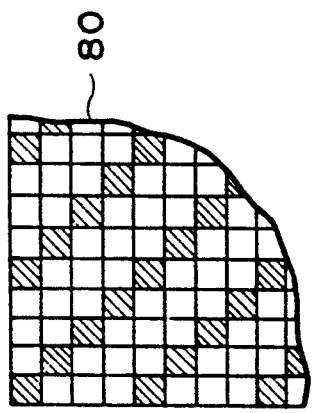
FIG. 9 is a partial enlarged view of a mask in FIG. 8.

FIG. 9 is a partial enlarged view of the mask 80. 4×4 segments of the mask 80 are included in one shutter of the shutter array 79. Of these segments, four diagonal segments are openings. The pattern of these four segments is repeated on the entire surface of the mask 80.

Referring to FIG. 8, the switch array also includes a first photodetector array 81 and a second photodetector array 82.

Figure 10:
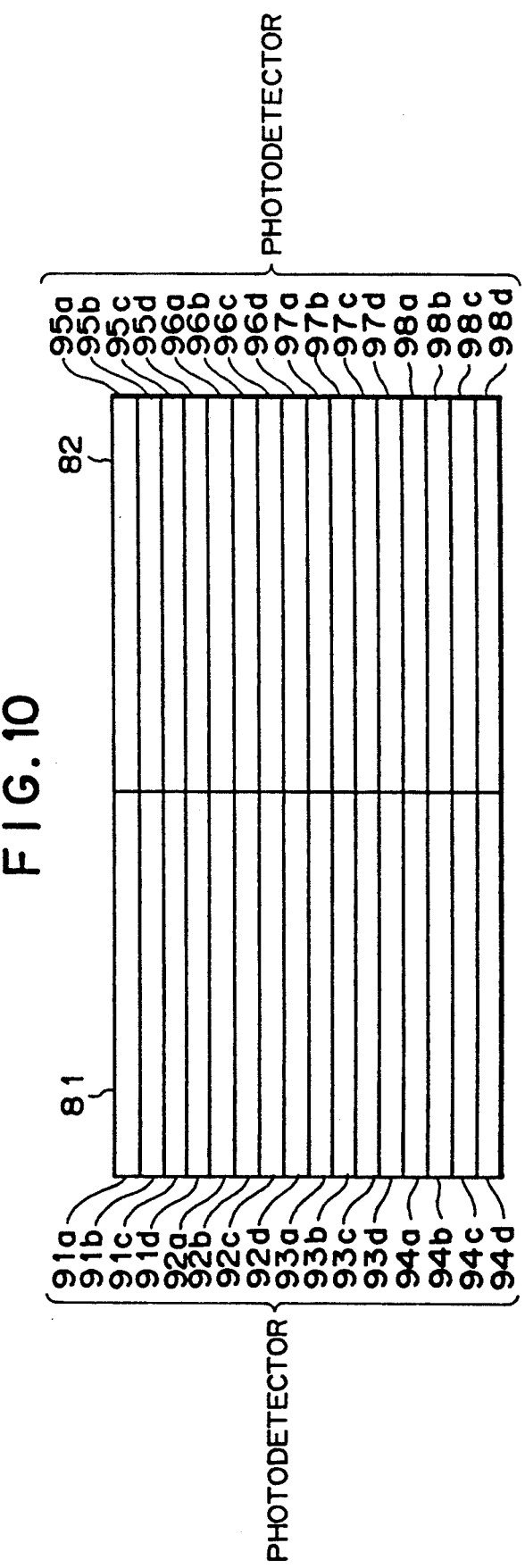
FIG. 10 is a front view of a photodetector array shown in FIG. 8.

FIG. 10 is a front view of the photodetector array. This photodetector array includes photodetectors 91a, 91b to 98c, and 98d. A first photodetector array 81 consists of the photodetectors 91a to 94d, and a second photodetector array 82 consists of photodetectors 95a to 98d.

The second embodiment shown in FIG. 8 is a switch array for connecting a set of four terminals (not shown) to another set of four terminals (not shown), i.e., a total of eight terminals. Four input lines and four output lines are connected to each terminal. The same reference numerals as in the surface emitting type light sources and the photodetectors denote the same parts. The surface emitting type light sources 71a to 74d are connected to the output lines from four terminals of the first group, and the surface emitting type light sources 75a to 78d are connected to four terminals of the second group. The photodetectors 91a to 94d are connected to the input lines of the four terminals of the second group, and the photodetectors 95a to 98d are connected to the input lines of the four terminals of the first group. In each group, pairs of surface emitting light sources and the photodetectors are connected to the same terminals in an order from the smaller number such that the surface emitting type light sources 71a to 71d and the photodetectors 95a to 95d belong to the same terminals.

In this embodiment, the beam from the light source need not be spread by an optical system because a surface emitting type light source is used. The arrangement on the photodetector side is the same as described above. That is, the optical system for focusing the beam is eliminated, and instead the surface photodetectors are used.

The surface emitting type light sources 71a to 71d are driven to emit light in accordance with input signals from one terminal of the first group. If the shutter array 79 has the same pattern of light-transmitting portions as those of the first and second shutter arrays 46 and 47 of FIG. 5, the emitted beam passes through the portion of the third row and the first column of the shutter array 79 and is incident on the mask 80. The mask 80 is arranged to connect the input lines of a source terminal which transmits a signal to the output lines of each terminal. The surface emission light sources and the photodetectors having the same suffix letters a, b, c, and d exchange the signals such that light beams from the surface emitting type light sources 71a to 71d having the diagonal openings are detected by the photodetectors 93a to 93d. Bit signals representing address signals, data signals, and the like need not be connected to other bit signals. Predetermined bit signals can be connected to other bit signals. The mask 80 can reduce the number of shutters in the shutter array 79. Use of such a mask is proposed by the present inventors in Japanese Patent Laid-Open No. 61-191165 (corresponding U.S. Ser. No. 231,004).

Outputs from the photodetectors 93a to 93d are sent to one terminal of the second group. This indicates that the signals are sent from the terminal of the first group to the terminal of the second group. This transmission can be equally performed to transmit a signal from another terminal of the first group to another terminal of the second group. In this case, the surface emitting type light sources 71a to 74d, the left half of the shutter array 79, the left half of the mask 80, and the first shutter array 81 are used to perform this signal transmission.

Signal transmission from the terminals of the second group to the terminals of the first group is performed by the remaining portion. More specifically, the input signals from the terminals of the second group which have received the outputs from the photodetectors 93a to 93d are sent to the surface emitting type light sources 77a to 77d. Since the shutter of the first row and the seventh column of the shutter array 79 is set in a light-transmitting state, the beams from the surface emitting type light sources 77a to 77d pass through the shutter array 79 and the mask 80 and are then incident on the photodetectors 95a to 95d in the second photodetector array 82.

Since the photodetectors 95a to 95d are connected to the terminals of the first group connected to the surface emitting type light sources 71a to 71d, bidirectional transmission can be performed. This can be true in other terminals.

Each light source in this embodiment has the same length as that of the shutter array in the longitudinal direction. The first and second photodetector arrays 81 and 82 have the same lengths as those of the left and right halves of the shutter array 79 in the lateral direction. The light sources, the shutter array, the mask, and the photodetectors are arranged in contact with each other.

In this embodiment, the lenses are omitted, and the light sources 71a to 78d, the shutter array 79, the mask 80, and the first and second photodetector arrays 81 and 82 are integrally formed to advantageously obtain a compact apparatus.

Figure 11:
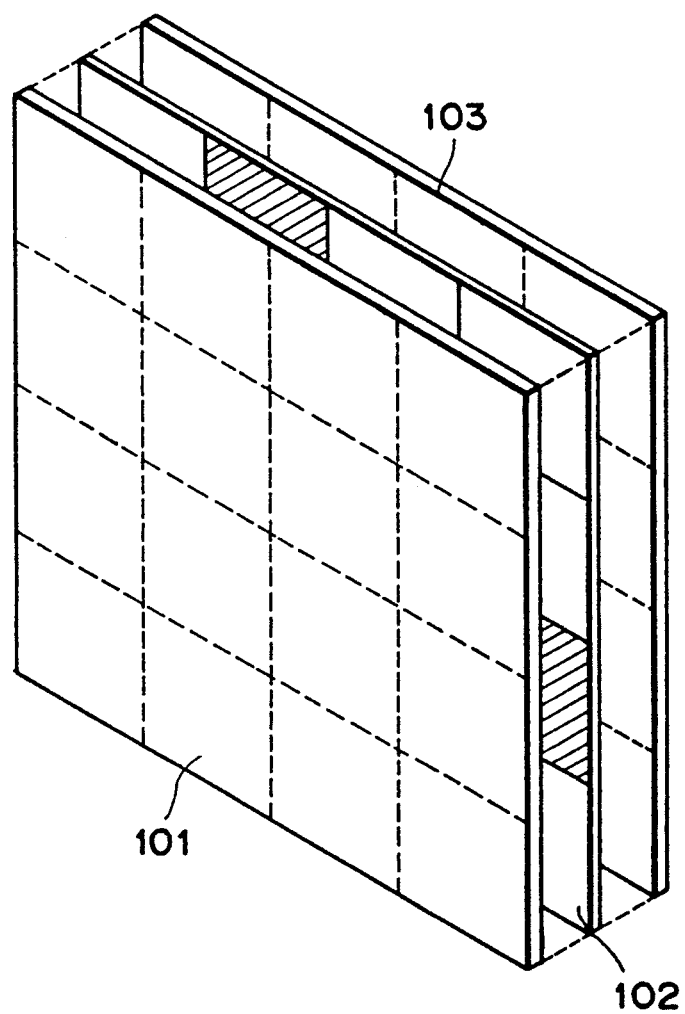
FIG. 11 is a perspective view showing a main structure of the third embodiment of the present invention.

FIG. 11 is a perspective view showing a main part of the third embodiment of the present invention. A switch array of this embodiment comprises a light source array 101 for emitting light in each area defined by the broken lines, a shutter array 102, and a photodetector array 103.

Figure 12:
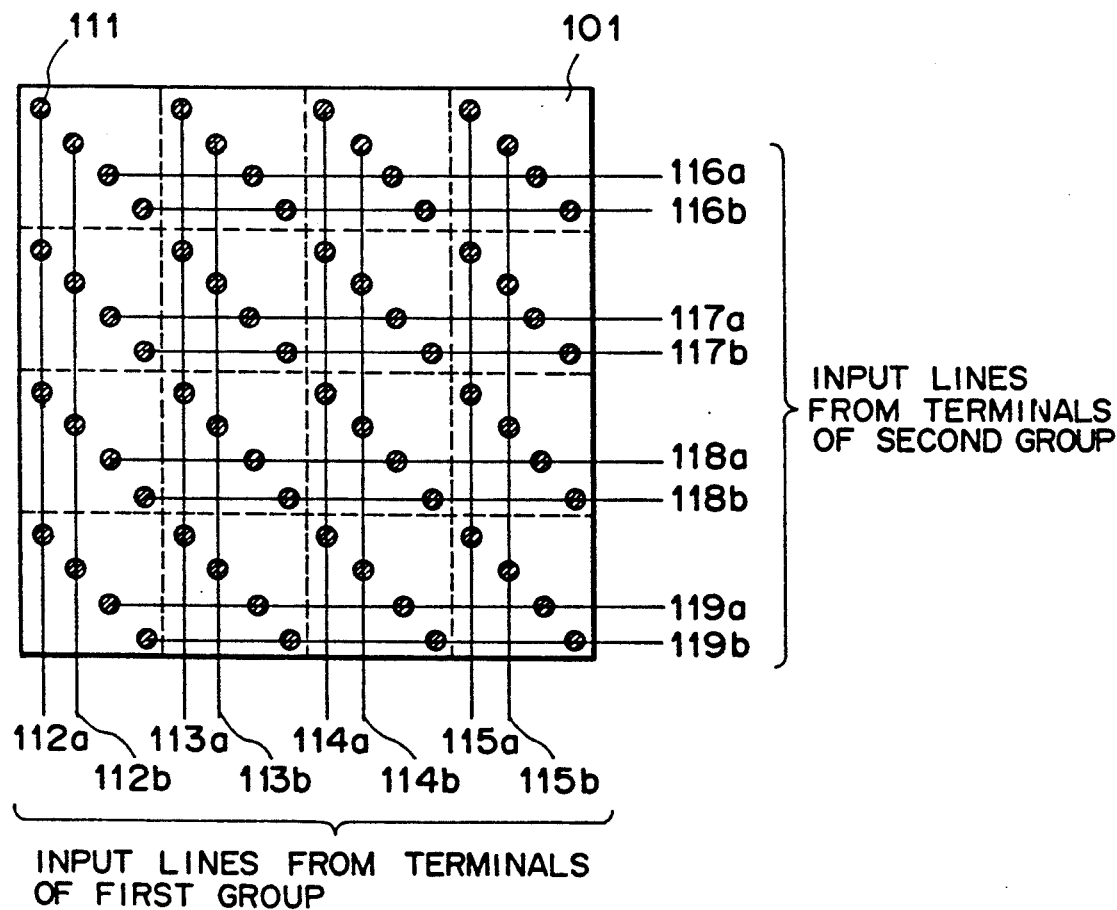
FIG. 12 is a front view of a light source array shown in FIG. 11.

FIG. 12 is a front view of the light source array 101. The light source array 101 comprises light sources 11₁, input lines 112a to 115b from the terminals of the first group, and input lines 116a to 119b from the terminals of the second group.

Figure 13:
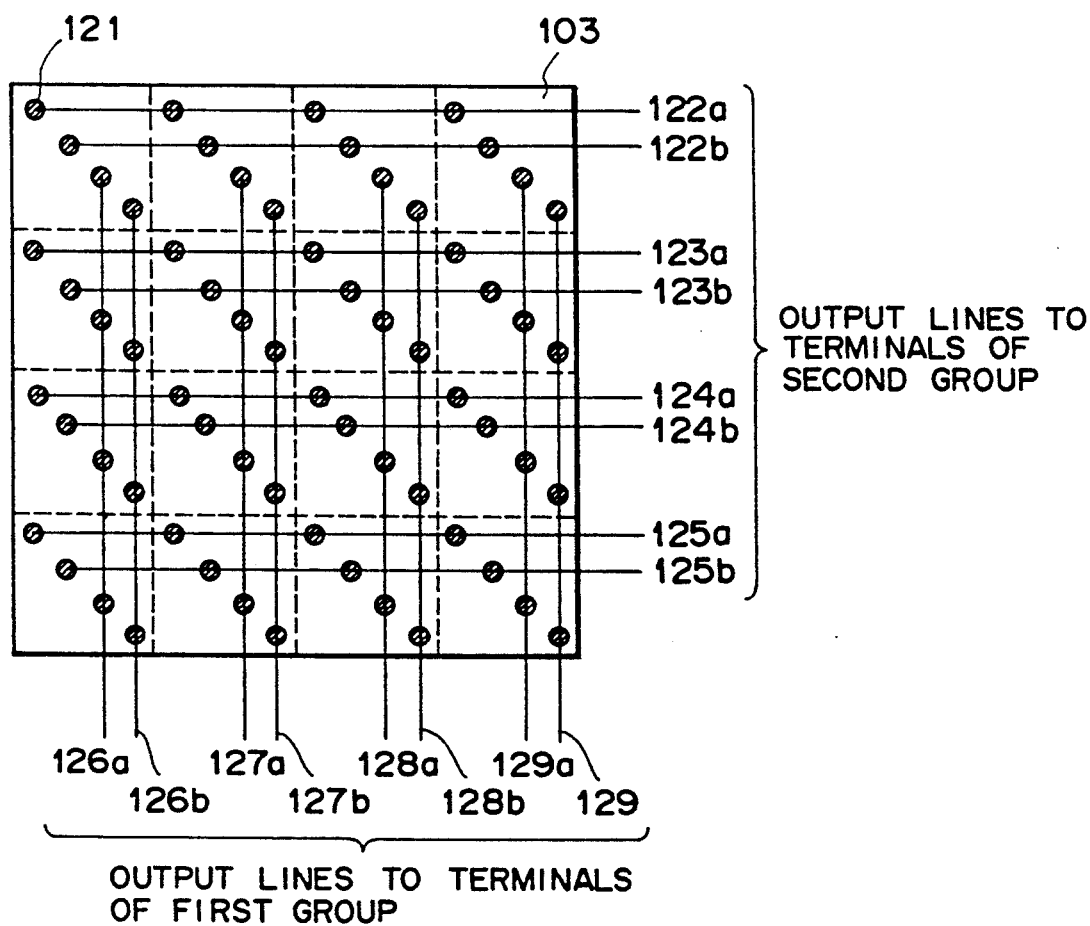
FIG. 13 is a front view of a photodetector array shown in FIG. 11.

FIG. 13 is a front view of the photodetector array 103. The photodetector array 103 comprises photodetectors 121, output lines 122a to 125b to the terminals of the second group, and output lines 126a to 129b to the terminals of the first group.

FIGS. 11, 12, and 13 show an optical switch array for connecting a set of four terminals to another set of four terminals, i.e., a total of eight terminals. Two input lines and two output lines are connected to each terminal.

The light sources $11_1$ in the light source array 101 are diagonally arranged.

Referring to FIGS. 12 and 13, the input lines 112a to 115b from the terminals of the first group are vertically arranged and are connected to the four light sources $11_1$. The input terminals 116a to 119b from the terminals of the second group are horizontally arranged and are connected to the four light sources 111. The shutter array 102 includes 4×4 shutters. The size of one shutter of the first shutter array 46 shown in FIG. 5 is the same as one area defined by the dotted lines in FIG. 12. The four light sources 111 can be arranged in each area.

In the photodetector array 103, the photodetectors 121 are arranged at the positions of the light sources 111 of the light source array 101 in a one-to-one correspondence. The output lines 122a to 125b to the terminals of the second group are horizontally arranged and are connected to the four photodetectors 121, respectively.

The relationship between the terminals of the first and second groups and the input and output lines is the same as that of the second embodiment. The input and output lines are paired from the smaller number and ar connected to the same terminal of the same group. For example, the input lines 112a and 112b from a terminal of the first group belong to the same terminal of the first group, and the output lines 126a and 126b to a terminal of the first group belong to the same terminal of the first group.

The eight light sources 111 connected to the input lines 112a and 112b are driven to emit light by input signals on the input terminals 112a and 112b from one terminal of the first group. If the shutter array 102 has the same pattern of light-transmitting shutters as that of the first shutter array in FIG. 5, the shutter of the third row and the first column is set in a light-transmitting state, and beams from the two corresponding light sources 111 are transmitted and are received by the two photodetectors 121 of the third row and the first column in one of the eight areas (divided by the dotted lines) connected to the input lines 124a and 124b to the terminal of the second group. The received signals are transmitted to one terminal of the second group through the input lines 124a and 124b of the second group. The reverse transmission from this terminal is performed through the input signal lines 118a and 118b from the terminal of the second group. Of the eight light sources 111 connected to these signal lines, the beam from the light source 111 located at the position corresponding tot he shutter of the third row and the first column of the shutter array 102 in the shutter array 102 reaches the photodetector array 103 through the shutter array 102. This beam is received by the two of the eight photodetectors 121 which are connected tot he output lines 126a and 126b to the terminal of the first group. Since the terminal which receives signals through the output lines 126a and 126b connected to the terminal of the first group is a terminal connected to the input lines 112a and 112b connected to the terminal of the first group, bidirectional transmission can be performed.

This can apply to other terminals. Switching of connections is freely performed by switching of shutters in the shutter array 102. This embodiment can advantageously halve the number of shutters in the shutter array as compared with the two previous embodiments. An integral structure can be achieved in this embodiment as in the previous embodiments, thus providing a compact, stable optical switch array.

In this embodiment, the plurality of inputs or signal lines are connected to each terminal, and this connection allows diagonal layout of the light sources 111 and the photodetectors 121 as in the mask 80 of the second embodiment.

Figure 14:
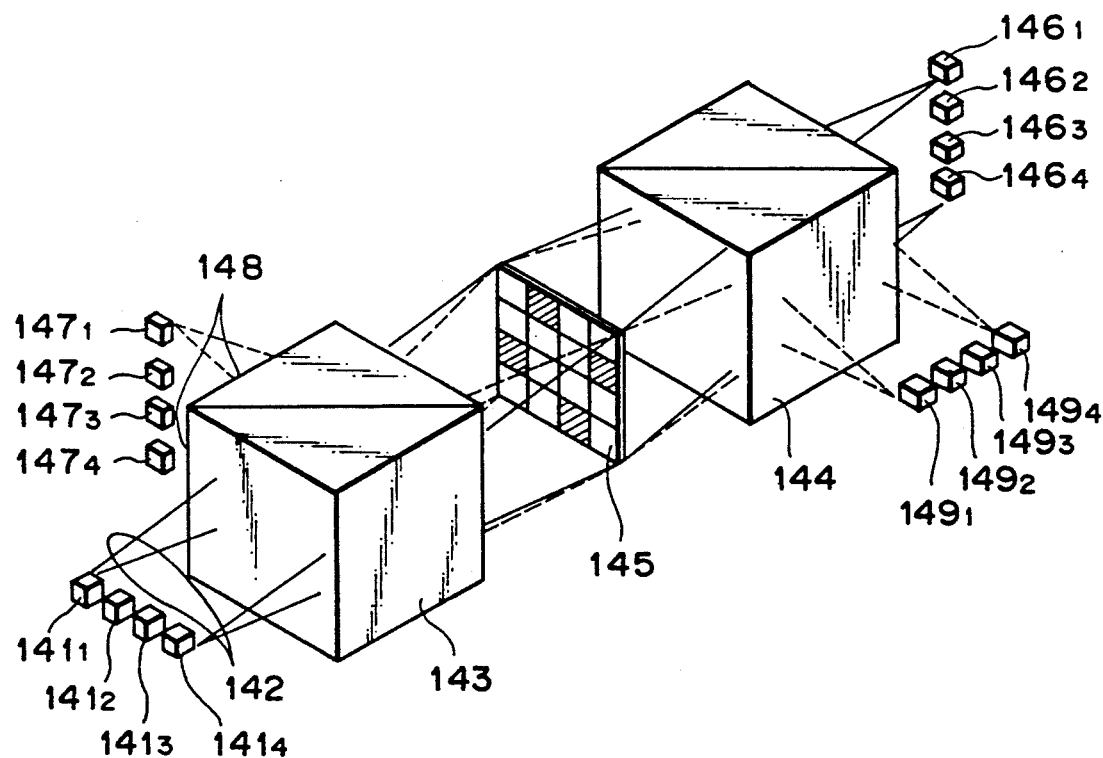
FIG. 14 is a perspective view showing an arrangement of the fourth embodiment of the present invention.

FIG. 14 is a perspective view showing an arrangement according to the fourth embodiment of the present invention. An optical switch array of this embodiment comprises four light sources $141_1$ to $141_4$ of the first group which are driven by four terminals of the first group (not shown) and which emit beams 142, a shutter array 145, and four photodetectors $146_1$ to $146_4$ of the first group for sending reception signals to four terminals of the second group (not shown).

The optical switch array also includes four light sources $147_1$ to $147_4$ of the second group which are driven by the signals from the terminals of the second group and which emit beams 148, and terminals $149_1$ to $149_4$ of the second group for sending the reception signals to the terminals of the first group.

The nth terminal of the first group sends a signal to the light source $141_n$ of the first group and receives a signal from the photodetector $149_n$ of the second group. Similarly, the kth terminal of the second group sends a signal to the light source $147_k$ of the second group and receives a signal from the photodetector $146_k$ of the first group.

The beams 142 from the light sources $141_1$ to $141_4$ of the first group pass through a first beam splitter 143 and is incident on the shutter array 145. Propagation of the output beams 142 is indicated by solid lines. The output beams 142 having passed through the shutter array 145 pass through a second beam splitter 144 and are received by the photodetectors $146_1$ to $146_4$ of the first group, respectively. Although an optical system is simply illustrated in FIG. 14, the first anamorphic optical system shown in FIG. 6 is actually inserted between the light sources $141_1$ to $141_4$ of the first group and the first beam splitter 143, and the second anamorphic optical system shown in FIG. 7 is actually inserted between the second beam splitter 144 and the photodetectors $146_1$ to $146_4$ of the first group. The light sources $141_1$ to $141_4$ of the first group, the shutter array 145, and the photodetectors $146_1$ to $146_4$ of the first group constitute a crossbar switch. Since there are four terminals of the first group and four terminals of the second group in the arrangement of FIG. 14, the shutter array 145 has a 4×4 matrix size.

The output beams 148 from the light sources $147_1$ to $147_4$ of the second group are reflected by the first beam splitter 143 and are incidence on the shutter array 145. The incident beams are reflected by the second beam splitter 144 again, and the reflected beams are respectively incident on the photodetectors $149_1$ to $149_4$ of the second group. Propagation of the beams 148 is indicated by dotted lines. The same arrangement as the first crossbar switch associated with the beams represented by the solid lines can be obtained except that the light sources $147_1$ to $147_4$ of the second group are perpendicular to the light sources $141_1$ to $141_4$ of the first group, and the photodetectors $149_1$ to $149_4$ of the second group are perpendicular to the photodetectors $146_1$ to $146_4$ of the first group. More specifically, the first anamorphic optical system shown in FIG. 6 and the second anamorphic optical system shown in FIG. 7 are rotated through 90° about the optical axis, and the resultant optical systems are respectively inserted between the light sources $147_1$ to $147_4$ of the second group and the first beam splitter 143 and between the photodetectors of the second group and the second beam splitter 144, thereby constituting a crossbar switch for the beams indicated by the dotted lines.

Figure 15:
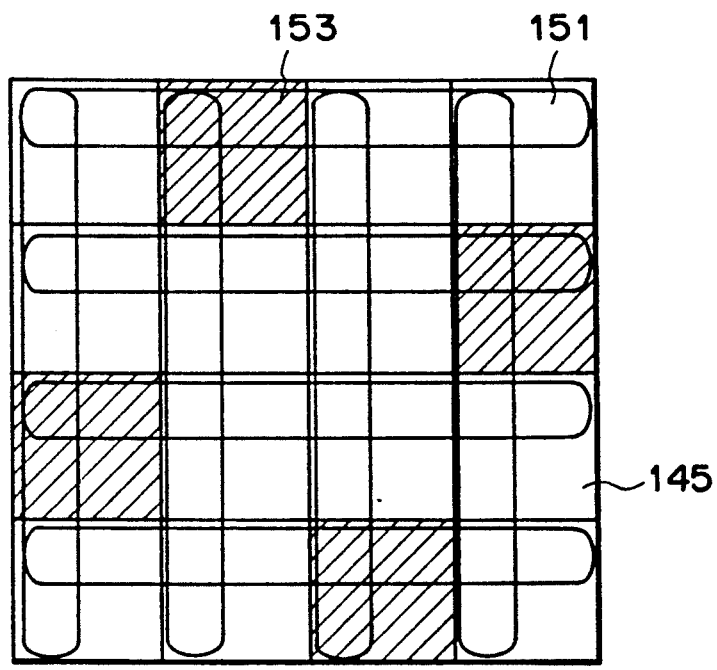
FIG. 15 is a front view showing a portion wherein a shutter array in FIG. 14 is used as a first crossbar switch.
Figure 16:
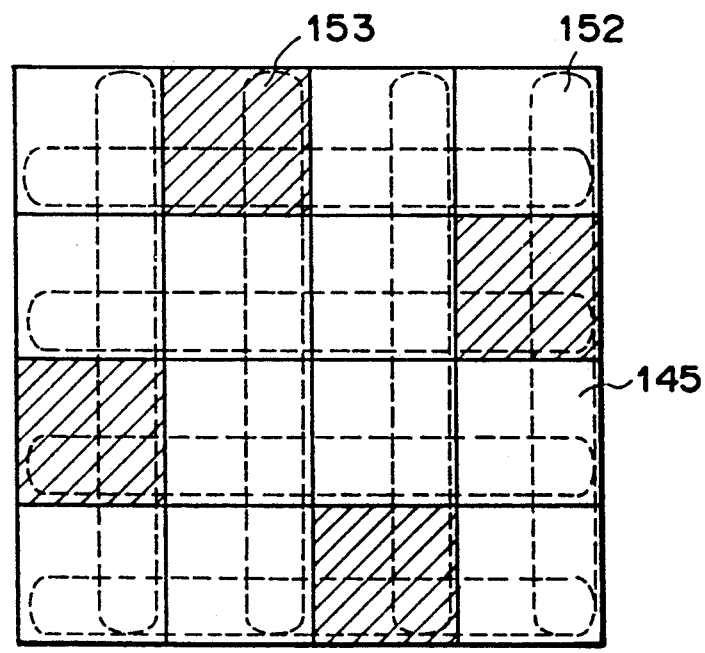
FIG. 16 is a front view showing a portion wherein the shutter array shown in FIG. 14 is used as a second crossbar switch.

FIG. 15 is a front view showing part of the shutter array 145 associated with the first crossbar switch, and FIG. 16 is a front view showing part of the shutter array 145 associated with the second crossbar switch.

A portion 151 of the shutter array 145 is used as the first crossbar switch. A vertical region represents a range in which the output beams 142 from the light sources $141_1$ to $141_4$ of the first group illuminate the shutter array 145. A horizontal region of the shutter array 145 represents a range in which the transmission beams are received by the photodetectors $146_1$ to $146_4$ of the first group. Similarly, a portion 152 of the shutter array 145 is used by the second crossbar switch. A horizontal region of the shutter array 145 represents a range in which the output beams from the light sources $147_1$ to $147_4$ of the second group illuminate the shutter array 145. A vertical region of the shutter array 145 represents a range in which the transmission beams are received by the photodetectors $149_1$ to $149_4$ of the second group. A hatched portion 153 represents a specific shutter of the first row and the second column.

Referring to FIGS. 14, 15, and 16, hatched portions of the shutter arrays 145 are light-transmitting portions. The shutter 153 is taken as an example. In the first crossbar switch, the beam from the light source $141_2$ of the first group passes through the shutter 153 and is received by the photodetector $146_1$ of the first group. Therefore, the shutter 153 has a function of transmitting the signal from the second terminal of the first group to the first terminal of the second group. In the second crossbar switch, the shutter 153 allows transmission of the beam from the light source $147_1$ of the second group to the photodetector $149_2$ of the second group. In other words, the signal from the first terminal of the second group is transmitted to the second terminal of the first group. As a result, bidirectional communication between the second terminal of the first group and the first terminal of the second group is performed through the shutter 153. The same operations as described above can be performed in other shutters in the shutter array 145. When a shutter of the ith row and the jth column of the shutter array 145 serves as a light-emitting portion, bidirectional communication between the jth terminal of the first group and the ith terminal of the second group can be achieved.

If a plurality of signal lines are connected to each terminal, the mask 80 shown in FIG. 9 can be used together with the shutter array 145.

Although the beams in the first and second crossbar switches are spatially separated from each other, as shown in FIGS. 15 and 16, crosstalk may occur due to insufficient separation. In order to prevent the crosstalk, it is desired to form a mask on the shutter area or obtain a desired shutter shape. When the shutter 153 is divided into four parts by two lines passing its center, necessary light-transmitting portions are only the upper left and lower right parts. When only the upper left and lower right parts of the shutter 153 are constituted by the light-transmitting portions, crosstalk components can be reduced.

In order to reduce the crosstalk components and increase utilization efficiency of light, the output beams from the light sources $141_1$ to $141_4$ of the first group and the output beams from the light sources $147_1$ to $147_4$ are set to be linearly polarized beams perpendicular to each other, and the first and second beams splitters 143 and 144 are constituted by polarizing beam splitters. In this case, an absorption type switch whose characteristics are not greatly changed in the polarization direction of the incident light is preferably used as the shutter array 145.

Alternatively, the wavelengths of the output beams 142 and 148 may be changed, and the first and second beam splitters 143 and 144 may be constituted by spectral beam splitters. In this case, a desired operation must be performed using the wavelengths of these splitters as the characteristics of the shutter arrays 145.

Figure 17:
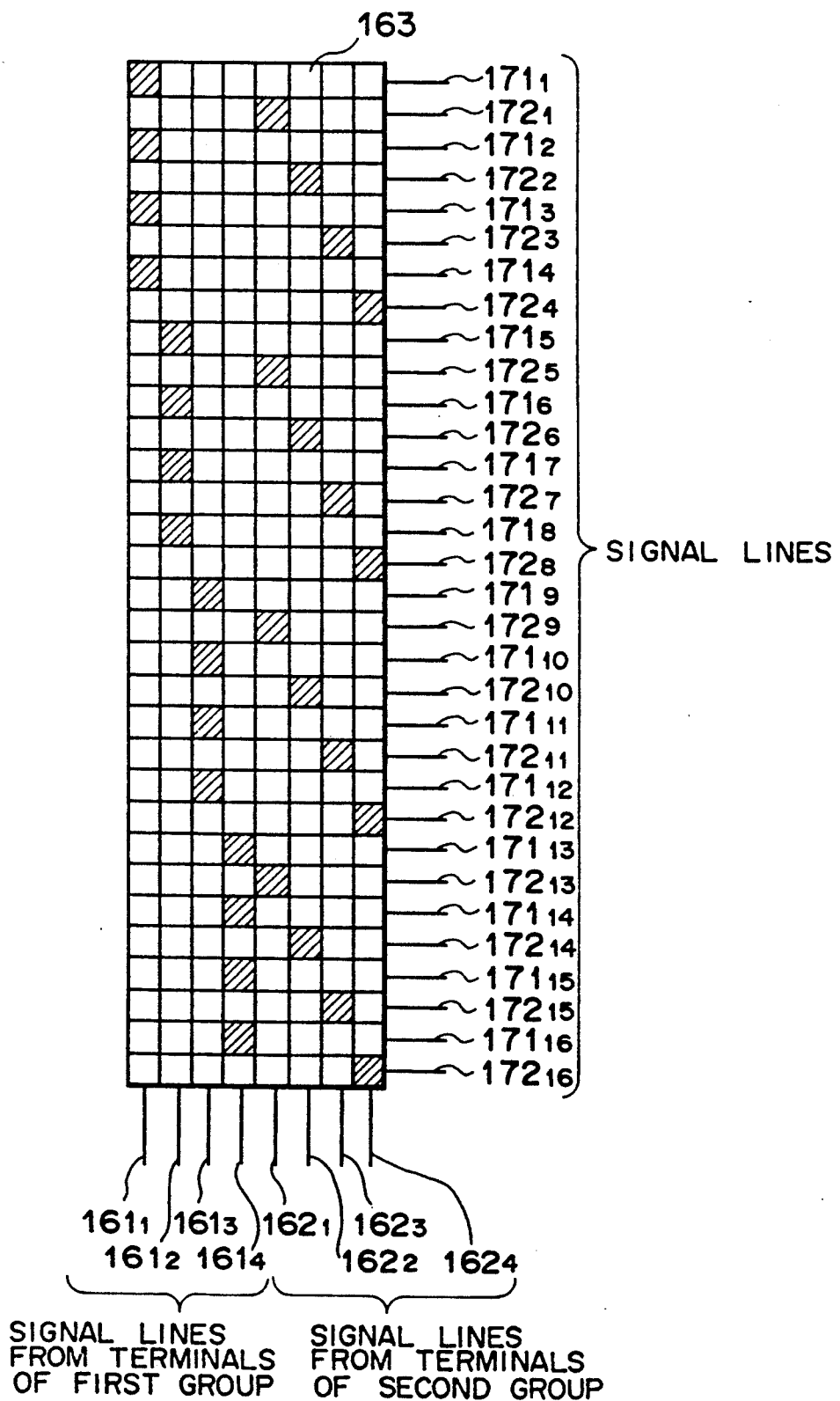
FIG. 17 is a schematic view showing a main part of the fifth embodiment of the present invention.

FIG. 17 is a schematic view showing a main part of the fifth embodiment of the present invention.

This embodiment exemplifies a 4×4 crossbar switch for connecting four terminals of the first group to four terminals of the second group.

Signal lines $161_1$ to $161_4$ are connected from terminals of the first group. The signal line $161_k$ is connected to the kth terminal of the first group. Similarly, signal lines $162_1$ to $162_4$ are connected from the terminals of the second group. The signal line $162_\lambda$ is connected to the λth terminal of the second group. A mask 163 has openings or light-transmitting portions indicated by hatched portions. Signal lines $171_1$ to $171_{16}$ are connected to the terminal second group, and signal lines $172_1$ to $172_{16}$ are connected to the terminals of the first group.

Figure 18:
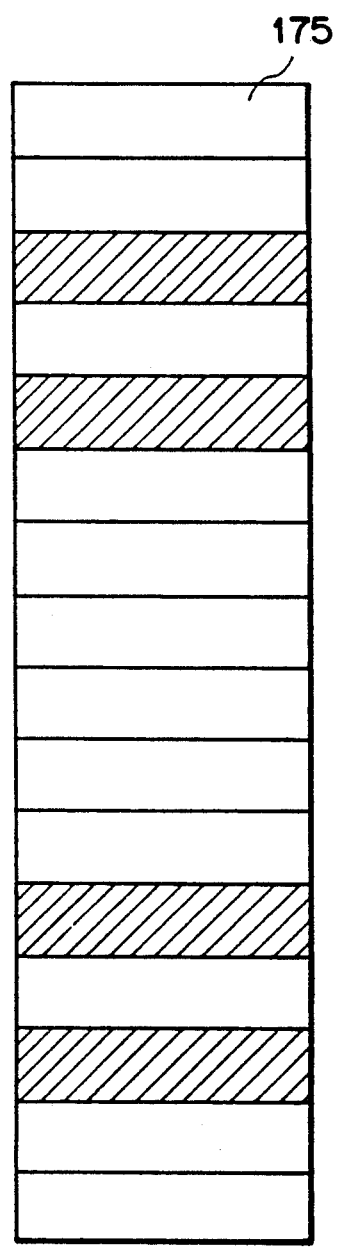
FIG. 18 is a schematic view showing a shutter array according to the fifth embodiment of the present invention.

FIG. 18 is a schematic view showing a shutter array used in the fifth embodiment of the present invention. A shutter array 175 is the same as those described in the previous embodiments, except that the array in the fifth embodiment is a one-dimensional array. Hatched portions are light-transmitting shutters, respectively.

The shutter array 175 is used after the mask 163 overlaps the shutter array 175. Each shutter in the shutter array 175 includes two openings or light-transmitting portions of the mask 163.

Signals on the signal lines $161_1$ to $161_4$ from the terminals of the first group or the signal lines $162_1$ to $162_4$ from the terminals of the second group are converted into beams, and the beams are spread in the vertical direction. The beams pass through the shutter array 175 and the mask 163. These beams are gradually focused in the horizontal direction and are sent to the signal lines $171_1$ to $171_{16}$ to the terminals of the second group or the signal lines $172_1$ to $172_{16}$ to the terminals of the first group. A means for spreading the beams in the vertical or horizontal direction can be a lens or fibers as shown in other embodiments described above. Electric-to-optical conversion and optical-to-electric conversion can be performed at any stage. For example, this conversion can be performed in front of the shutter 175 and the mask $16_3$ or at the terminal by using fibers.

Assume that bidirectional communication is performed between the kth terminal of the first group and the λth terminal of the second group is performed. In this case, a beam is set to pass through the $\{4(k-1)+\lambda\}$th shutter in the shutter array 175. Connections of the signal lines $171_1$ to $171_{16}$ and $172_1$ to $172_{16}$ to the terminals to the first or second group are as follows. The signal lines 171 affixed with $\{4(m-1)+i\}$th $(m=1, 2, \ldots)$ line numbers are connected to the ith terminal of the second group. The signal lines 172 affixed with $\{4(j-1)+n\}$th $(n=1, 2, \ldots)$ line numbers are connected to the jth terminal of the first group. As is apparent from the above description, the plurality of signal lines are connected to each terminal, and combinations of a plurality of signal lines can be selected in the stage of optical or electrical signals.

Assume that the first terminal of the first group and the third terminal of the second group is performed. In this case, a signal is set to pass through the third shutter from the top in the shutter array 175. A signal from the first terminal of the first group is sent to the signal line $161_1$, and a beam emitted from the corresponding light source passes through the third shutter from the top in the shutter array 175 and then passes through the mask 163. This beam is then directed toward the signal line $171_3$. The signal line $171_3$ is connected to the third terminal of the second group. A signal from the third terminal of the second group is sent through the signal line $162_3$. A beam emitted from the corresponding light source passes through the third shutter from the top in the shutter array 175 and then passes through the mask 163. The beam is directed toward the signal line $172_3$. The signal $172_3$ is connected to the first terminal of the first group, and bidirectional communication is thus performed. The same operations as described above can be performed for other terminals. Bidrectional communication channel control can be achieved by opening/closing of one shutter.

The portions of the mask 163 for transmitting signals from the terminals of the second group to the terminals of the first group are grouped in units of the terminals of the first group, every four beams may be focused obliquely along the openings or light-transmitting portions.

When a plurality of signal lines are connected to each terminal, the openings or light-transmitting portions of the mask 163 may be arranged as oblique layout as in the mask 80.

This embodiment has an advantage in that shutters can be aligned in line to obtain a one-dimensional shutter array.

The optical switch array of the fifth embodiment can be generalized as follows. That is, in order to connect the first group consisting of M signal transmission/reception terminals to the second group consisting of N terminals, the segments of the mask are arranged in a matrix of the (M+N) rows and 2(M×N) columns. This mask is arranged to allow transmission of light through the segment of the pth row and the qth column.

If $1 \leq p \leq M$, then
$q = 2N(p-1) + 2(r-1) + 1$
$r = 1, 2, \ldots, N$
If $M+1 \leq p \leq M+N$, then
$q = 2N(s-1) + 2(p-M-1) + 2$
$s = 1, 2, \ldots, M$ The shutter array has two-column segments of the mask as a unit and is constituted by M×N openable shutters arranged in units of segments.

A first light-emitting means consisting of M light sources is arranged in correspondence with the first to Mth rows of the segments of the mask. Each light source of the first light-emitting means is driven by a signal input from each terminal of the first group. A second light-emitting means consisting of N light sources is arranged in correspondence with the (M+1)th row to the (M+N)th row of the mask. Each light source of the second light-emitting means is driven by a signal input from each terminal of the second group. The light-receiving means is constituted by 2(M×N) photodetectors arranged in correspondence with the columns of the segments of the mask. The light-receiving means receives light emitted from the first and second light-emitting means and passing through the mask and the shutter array. The light-receiving means is arranged such that the photodetector corresponding to the $\{4(m-1)+i\}$th (where $i=1, 2, 3, \ldots, N; m=1, 2, 3, \ldots, M$) column of the segment outputs a signal to the ith terminal of the second group and the photodetector corresponding to the $\{4(j-1)+n\}$th $(j=1, 2, 3, \ldots M; n=1, 2, \ldots, N)$ column of the segment outputs a signal to the jth terminal of the first terminal.

The shutter array is driven to open the $\{4(k-1)+\lambda\}$th shutter when the kth terminal of the first group is connected to the ℓth terminal of the second group.

Figure 19:
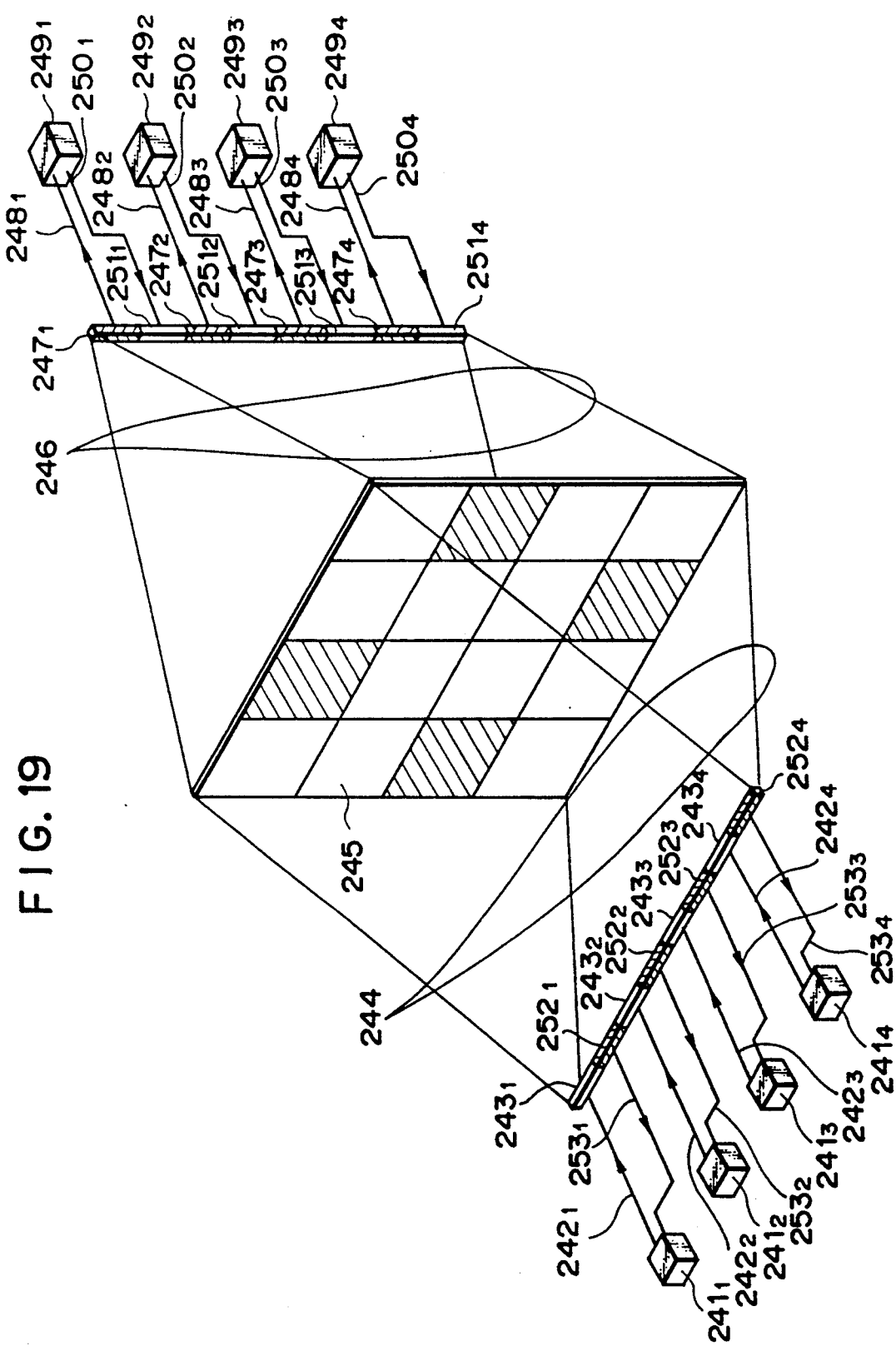
FIG. 19 is a schematic perspective view showing the sixth embodiment of the present invention.

FIG. 19 is a schematic view showing an arrangement of the sixth embodiment of the present invention.

In this embodiment, four terminals $241_1$ to $241_4$ of the first group exchange data with four terminals $249_1$ to $249_4$ of the second group through a bidirectional optical switch array.

Four first light sources $243_1$ to $243_4$ and four second photodetectors $252_1$ to $252_4$ are alternately arranged for the four terminals $241_1$ to $241_4$ of the first group. Four second light sources $251_1$ to $251_4$ and four first photodetectors $247_1$ to $247_4$ are alternately arranged for four terminals $249_1$ to $249_4$ of the second group. These components will be simply referred to as "first light sources $243_1$ to $243_4$", "second photodetectors $252_1$ to $252_4$", "first photodetectors $247_1$ to $247_4$", and "second light sources $251_1$ to $251_4$" hereinafter. The terminals $241_1$ to $241_4$ of the first group, the first light sources $243_1$ to $243_4$, and the second photodetectors $252_1$ to $252_4$ are horizontally arranged, while the terminals $249_1$ to $249_4$ of the second group, the second light sources $251_1$ to $251_4$, and the first photodetectors $247_1$ to $247_4$ are vertically arranged.

The terminals $241_1$ to $241_4$ and the terminals $249_1$ to $249_4$ output input signals $242_1$ to $242_4$ and input signals $250_1$ to $250_4$ to the first light sources $243_1$ to $243_4$ and the second light sources $251_1$ to $251_4$ to control their light emission, respectively. The terminals $241_1$ to $241_4$ and the terminals $249_1$ to $249_4$ receive output signals $253_1$ to $253_4$ representing light reception states and output from the second photodetectors $252_1$ to $252_4$ and output signals $248_1$ to $248_4$ representing light reception states and output from the first photodetectors $247_1$ to $247_4$. Output beams 244 from the first light sources $243_1$ to $243_4$ pass through the shutter array 245 and serve as transmission beams 246. The transmission beams 246 are received by the first photodetectors $247_1$ to $247_4$. The first light sources $243_1$ to $243_4$ and the second light sources $251_1$ to $251_4$ are arranged in the same manner as in the first embodiment.

An operation of this embodiment will be described below.

The first light sources $243_1$ to $243_4$ are driven by the signals $242_1$ to $242_4$ from the terminals $241_1$ to $241_4$ of the first group, respectively. The output beams 244 are obtained by spreading the beams from the light sources $243_1$ to $243_4$ by an optical system (not shown) in only the vertical direction. The output beams 244 are incident on the shutter array 245 and pass through the light-transmitting shutters. The light-transmitting shutters are indicated by hatched portions, respectively. The beams 246 having passed through the shutter array 245 are focused by an optical system (not shown) in only the horizontal direction, and the focused beams are incident on the first photodetectors $247_1$ to $247_4$, respectively.

In the light-transmitting state of the shutter array 245 shown in FIG. 19, the beams emitted from the first light sources $243_1$ to $243_4$ are respectively detected by the first photodetectors $247_3$, $247_1$, $247_4$, and $247_2$. For example, the beam emitted from the first light source $243_1$ is spread in the vertical direction and passes through the light-transmitting portion of the third row and the first column of the shutter array 245. The transmitted beam is then focused in the horizontal direction and is incident on the photodetectors $247_3$. The same operation as described above is repeated in other light sources and other photodetectors. Since the detection signals $248_1$ to $248_4$ from the first photodetectors $247_1$ to $247_4$ are supplied from the terminals $249_1$ to $249_4$ of the second group, the terminals $241_1$ to $241_4$ of the first group thus send the signals to the terminals $249_3$, $249_1$, $249_4$ and $249_2$ of the second group, respectively. At this time, as previously described, the terminals $249_1$ to $249_4$ must send reception acknowledgement signals or the like to the terminals $241_1$ to $241_4$ which sent the signals thereto. The input signals $250_1$ to $250_4$ of the second group are input from the terminals $249_1$ to $249_4$ to the second light sources $251_1$ to $251_4$ and drive them. Output beams from the second light sources $251_1$ to $251_4$ are spread in only the horizontal direction and are incident on the shutter array 245 from a direction opposite to the direction described above. After these beams pass through the shutter array 245, they are focused in only the vertical direction and are incident on the second photodetectors $252_1$ to $252_4$. In a state of the shutter array 245 shown in FIG. 19, the beams from the second light sources $251_1$ to $251_4$ are detected by the second photodetectors $252_2$, $252_4$, $252_1$, and $252_3$, respectively. For example, the beam from the second light source $251_1$ passes through the shutter of the first row and the second column of the shutter array 245 and is focused in the vertical direction. Therefore, the focused beam is detected by the second photodetector $252_2$. This can apply to the other light sources and other photodetectors. Since the output signals $253_1$ to $253_4$ from the second photodetectors $252_1$ to $252_4$ are sent to the terminals $241_1$ to $241_4$ of the first group, the signals from the terminals $249_1$, $249_2$, $249_3$, and $249_4$ of the second group are sent to the terminals $241_2$, $241_4$, $241_1$, and $241_3$, respectively. Therefore, bidirectional transmission can be performed in combinations of $(241_1,249_3)$, $(241_2,249_1)$, $(241_3,249_4)$, and $(241_4,249_2)$ terminals of the first and second groups. In order to change these combinations, the positions of the light-transmitting portions of the shutter array 245 are changed.

Optical systems arranged between the shutter array and the light sources and between the shutter array and the photodetectors can be first and second anamorphic optical systems in FIGS. 6 and 7 as in the first embodiment. However, these optical systems can be replaced with optical coupling using the fiber bundles.

Figure 20:
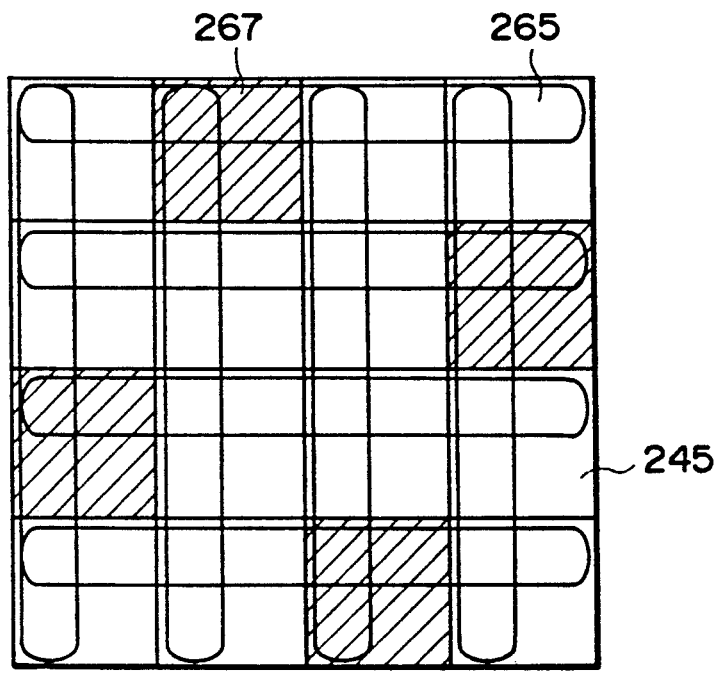
FIGS. 20 and 21 are plan views showing portions of a shutter array of FIG. 19 which are associated with signal transmission in the respective directions.
Figure 21:
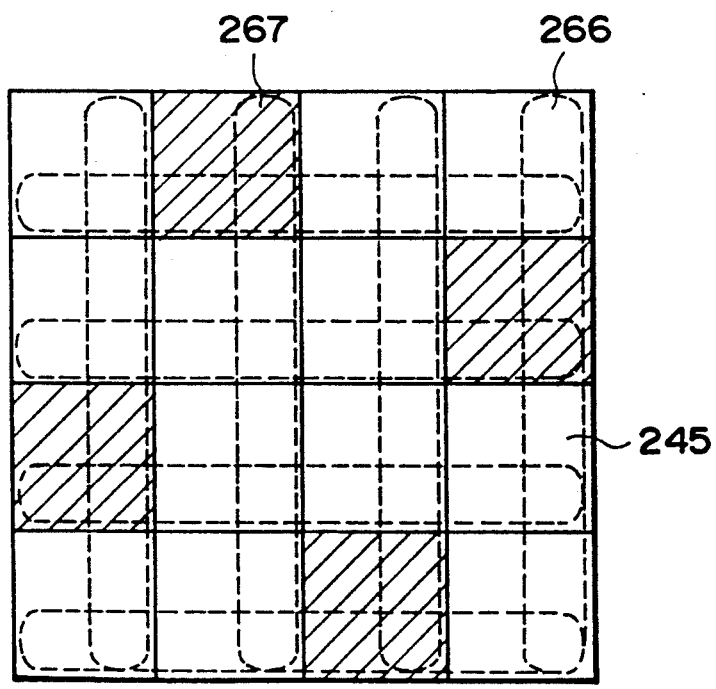

FIG. 20 is a front view showing part of the shutter array 245 associated with signal transmission from the first terminals $241_1$ to $241_4$ to the terminals $249_1$ to $249_4$ of the second group, and FIG. 21 is a front view showing part of the shutter array 245 associated with reverse transmission. A portion 265 of the shutter array 245 is used as the forward signal transmission shown in FIG. 20. A vertical region represents a range in which the output beams 244 from the first light sources $243_1$ to $243_4$ illuminate the shutter array 245. A horizontal region of the shutter array 245 represents a range in which the transmission beams are received by the first photodetectors $247_1$ to $247_4$. Similarly, a portion 266 of the shutter array 245 is used in the reverse signal transmission shown in FIG. 21. A horizontal region of the shutter array 245 represents a range in which the output beams from the second light sources $251_1$ to $251_4$ illuminate the shutter array 245. A vertical region of the shutter array 245 represents a range in which the transmission beams are received by the second photodetectors $252_1$ to $252_4$. A hatched portion 267 represents a specific shutter of the first row and the second column.

Referring to FIGS. 20 and 21, hatched portions of the shutter arrays 245 are light-transmitting portions. The shutter 267 is taken as an example. In the forward signal transmission, the beam from the first light source $243_2$ passes through the shutter 267 and is received by the first photodetector $247_1$. Therefore, the shutter 267 has a function of transmitting the signal from the second terminal of the first group to the first terminal of the second group. In the reverse signal transmission, the shutter 267 allows transmission of the beam from the second light source $251_1$ to the second photodetector $252_2$. In other words, the signal from the first terminal of the second group is transmitted to the second terminal of the first group. As a result, bidirectional communication between the second terminal of the first group and the first terminal of the second group is performed through the shutter 267. The same operations as described above can be performed in other shutters in the shutter array 245. When a shutter of the ith row and the jth column of the shutter array 245 serves as a light-emitting portion, bidirectional communication between the jth terminal of the first group and the ith terminal of the second group can be achieved.

Although the beams in bidirectional transmission are spatially separated from each other, as shown in FIGS. 20 and 21, crosstalk may occur due to insufficient separation. In order to prevent the crosstalk, it is desired to form a mask on the shutter area or obtain a desired shutter shape. When the shutter 267 is divided into four parts by two lines passing its center, necessary light-transmitting portions are only the upper left and lower right parts, as shown in FIGS. 20 and 21. When only the upper left and lower right parts of the shutter are constituted by the light-transmitting portions, crosstalk components can be reduced.

Figure 22:
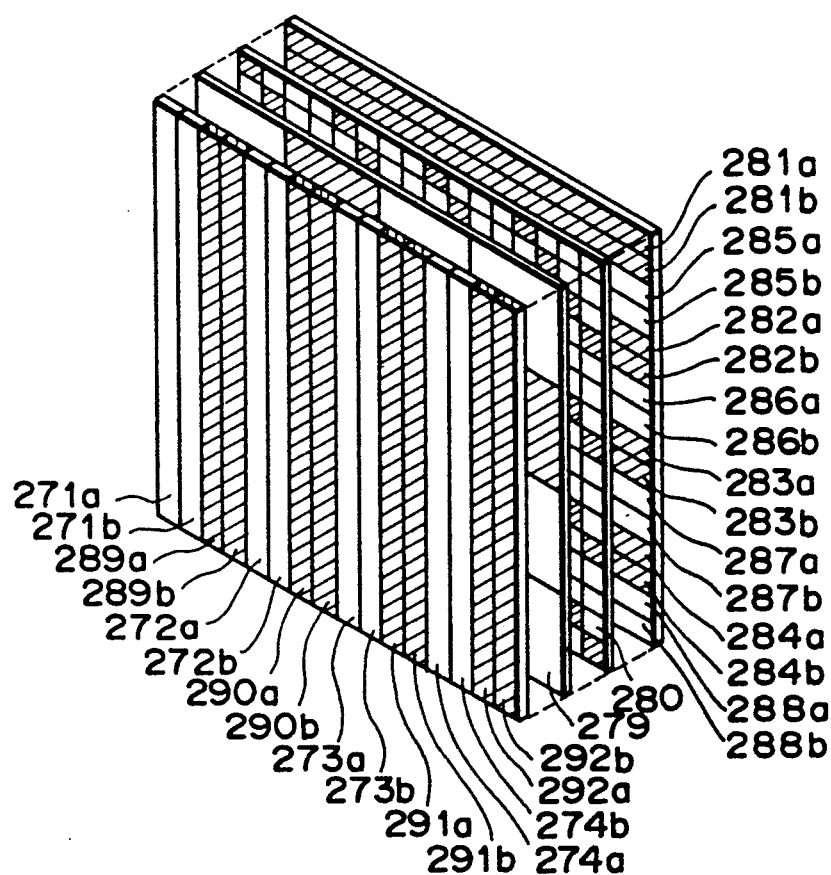
FIG. 22 is a perspective view showing a main part of the seventh embodiment of the present invention.

FIG. 22 is a perspective view showing a main part of the seventh embodiment of the present invention.

This embodiment comprises pairs of first surface emitting type light sources 271a and 271b, . . . 274a and 274b, pairs of first photodetectors 281a and 281b, . . . 284a and 284b, pairs of second surface emitting type light sources 285a and 285b, . . . 288a and 288b, pairs of second photodetectors 289a and 289b, . . . 292a and 292b, and a shutter array 279. The shutter array 279 is the same as that of the first embodiment. The pattern of the light-transmitting portions in this embodiment is the same as that in the first embodiment. The seventh embodiment also includes a mask 280 which is the same as that shown in FIG. 9. Hatched portions in the mask 280 are light-transmitting portions, respectively. Each shutter of the shutter array 279 includes 4×4 segments of the mask 280, and diagonal segments are four openings.

The pattern of the 4×4 segments is repeated on the entire surface of the shutter array 279.

The seventh embodiment shown in FIG. 22 exemplifies an optical switch array for connecting a set of four terminals (not shown) to another set of four terminals (not shown), i.e., a total of eight terminals. Two input lines and two output lines are connected to each terminal. The same numbers assigned to the surface emitting type light sources and photodetectors indicate that they are connected to the input or output lines of the same terminal. More specifically, the first surface emitting type light sources $271a$,..., $274b$ are connected to the input lines from the four terminals of the first group, and the second surface emission type light sources $285a$, . . . , $288b$ are connected to the input lines from the four terminals of the second group. Similarly, the first photodetectors $281a$,... $284b$ are connected to the input lines to the four terminals of the second groups, and the second photodetectors $289a, \ldots, 292b$ are connected to the input lines to the four terminals of the first group. The surface emitting type light sources and the photodetectors are paired from the smaller number and connected to the same terminal so as to cause the surface emitting type light sources $271a$ and $271b$ and the photodetectors $289a$ and $289b$ of the same group belong to the same terminal.

According to this embodiment, the beams from the light sources need not be spread by an optical system because the surface emitting type light source is used. This can apply to the photodetector side. That is, an optical system for focusing the beams are eliminated, and surface reception type photodetectors are used in place of the focusing optical system.

The surface emitting type light sources $271a$ and $271b$ are driven to emit light in accordance with an output signal from one terminal of the first group. When the shutter array 279 has the same pattern of the light-transmitting portions as that of the shutter array 245 shown in FIG. 19, the beams pass through the shutter of the third row and the first column of the shutter array 279 and are incident on the mask 280. The mask 280 is arranged to connect the input line from each terminal to an output line of the destination terminal. Since the mask 280 has openings arranged diagonally therein, signal exchange is performed between the corresponding combinations of the surface emitting type light sources and the photodetectors affixed with the same letters a and b as those of the light sources such that the beams from the surface emitting type light sources $271a$ and $271b$ are respectively received by the photodetectors $283a$ and $283b$.

Outputs from the photodetectors $283a$ and $283b$ are sent to one terminal of the second terminal, so that the signals are thus sent from the terminal of the first group to the terminal of the second group. This can apply to transmission of signals from other terminals of the first group to other terminals of the second group. Bidirectional communication can be performed by using the first surface emitting type light sources $271a$ and $271b$, . . . $274a$ and $274b$, and the first photodetectors $281a$ and $281b$, . . . $284a$ and $284b$.

Signal transmission from the terminals of the second group to the terminals of the first group is performed by using the second surface emitting type light sources $285a$ and $285b$, . . . $288a$ and $288b$, and the second photodetectors $289a$ and $289b$, . . . , $292a$ and $292b$. Input signals from the second terminal which received the outputs from the first photodetectors $283a$ and $283b$ are sent to the second surface emitting type light sources $287a$ and $287b$. Since the shutter of the first row and the third column of the shutter array 279 is set in a light-transmitting state, the beams from the second surface emitting type light sources $287a$ and $287b$ pass through the mask 280 and the shutter array 279 and are received by the photodetectors $289a$ and $289b$ of the photodetector array.

Since the second photodetectors $289a$ and $289b$ are connected to the terminal of the first group connected to the first surface emitting type light sources $271a$ and $271b$, bidirectional communication can thus be achieved. This can also apply to other terminals.

In this embodiment, lenses can be eliminated. The first and second surface emitting type light sources $271a, \ldots 274b$ and $285a, \ldots 288b$, the shutter array 279, the mask 280, and the first and second photodetectors $281a, \ldots 284b$ and $289a, \ldots, 292b$ can be integrated to obtain a compact apparatus.

Figure 23:
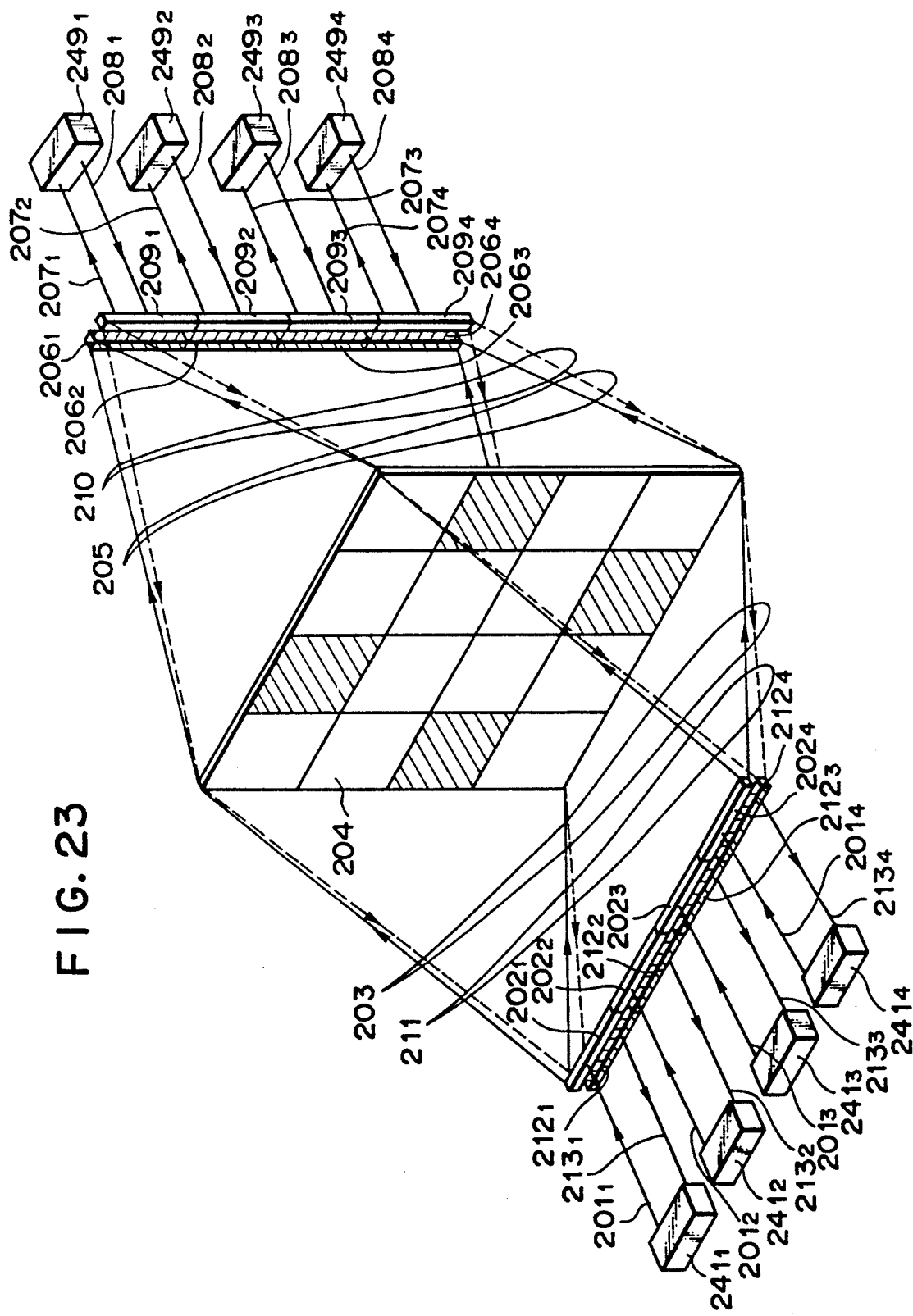
FIG. 23 is a schematic perspective view showing the eighth embodiment of the present invention.

FIG. 23 is a schematic view showing an arrangement of the eighth embodiment of the present invention.

In the manner as in the seventh embodiment shown in FIG. 19, reception and transmission are performed between terminals $241_1$ to $241_4$ of the first group and terminals $249_1$ to $249_4$ of the second group. Four first light sources $202_1$ to $202_4$ and four second photodetectors $212_1$ to $212_4$ are connected to the terminals $241_1$ to $241_4$ of the first group. Four first photodetectors $206_1$ to $206_4$ and four second light sources $209_1$ to $209_4$ are connected to the terminals $249_1$ to $249_4$ of the second group. The terminals $241_1$ to $241_4$, the first light sources $202_1$ to $202_4$ and the second photodetectors $212_1$ to $212_4$ are horizontally arranged, and the terminals $249_1$ to $249_4$, the first photodetectors $206_1$ to $206_4$ and the second light sources $209_1$ to $209_4$ are vertically arranged. A combination of the first light sources $202_1$ to $202_4$ and the first photodetectors $206_1$ to $206_4$ is parallel to that of the first photodetectors $206_1$ to $206_4$ and the second light sources $249_1$ to $249_4$. The terminals $241_1$ to $241_4$ and the terminals $249_1$ to $249_4$ output input signals $201_1$ to $201_4$ and input signals $208_1$ to $208_4$ to the first light sources $202_1$ to $202_4$ and the second light sources $209_1$ to $209_4$, respectively. The terminals $241_1$ to $241_4$ and the terminals $249_1$ to $249_4$ receive output signals $213_1$ to $213_4$ and output signals $207_1$ to $207_4$ representing light reception states from the second photodetectors $212_1$ to $212_4$ and the first photodetectors $206_1$ to $206_4$, respectively.

Output beams 203 from the first light sources $202_1$ to $202_4$ pass through a shutter array 204 arranged in the same as in the seventh embodiment, as indicated by the solid lines and serve as transmission beams 205. These beams 205 are incident on the first photodetectors $206_1$ to $206_4$. Output beams 210 from the second light sources $209_1$ to $209_4$ pass through the shutter array 204, as indicated by the broken lines, and serve as transmission beams 211. These beams 211 are incident on the second photodetectors $212_1$ to $212_4$.

The same anamorphic optical systems as in the first embodiment are used in this embodiment. More specifically, the first anamorphic optical system shown in FIG. 6 is arranged between the first light sources $202_1$ to $202_4$ and the second photodetectors $212_1$ to $212_4$, and the second anamorphic optical system shown in FIG. 7 is inserted between the shutter array 204 and the first photodetectors $206_1$ to $206_4$.

A crossbar switch shown in FIG. 23 is illustrated to connect four terminals of the first group to four terminals of the second group. As described with reference to the seventh embodiment, the eighth embodiment utilizes a function of the anamorphic optical system which allows focusing in a given direction and spreading of light in a direction perpendicular to the given direction. Positions of the light sources and the photodetectors can be freely selected in the direction to spread the beam, so that the light sources and the photodetectors can be arranged in two lines.

The first light sources $202_1$ to $202_4$ emit beams from the input signals $201_1$ to $201_4$ from the terminals $241_1$ to $241_4$ of the first group, respectively. Output beams 203 pass through the shutter array 204 and the transmission beam 205 are respectively detected by the first photodetectors $206_1$ to $206_4$, thus apparently constituting a unidirectional crossbar switch.

Since the first light sources $202_1$ to $202_4$ spread the output beams 203 in the vertical directions although they are slightly deviated in the vertical direction, the operation of the crossbar switch is not almost adversely affected. Similarly, even if the first photodetectors $206_1$ to $206_4$ are slightly moved in the horizontal direction, they can receive the transmission beams 205.

The signals received by the photodetectors $206_1$ to $206_4$ serve as output signals $207_1$ to $207_4$ to the terminals $249_1$ to $249_4$ of the second group, so that transmission from the terminals $241_1$ to $241_4$ of the first group can be performed.

The input signals $208_1$ to $208_4$ from the terminals of the second group drive the second light sources $209_1$ to $209_4$. The output beams 210 pass through the shutter array 204, and transmission beams 203 are respectively received by the second photodetectors $212_1$ to $212_4$. The second light sources $209_1$ to $209_4$, the shutter array 204, and the second photodetectors $212_1$ to $212_4$ constitute another crossbar switch. Horizontal movement of the second light sources $209_1$ to $209_4$ and vertical movement of the second photodetectors $212_1$ to $212_4$ do not adversely affect the operation of the crossbar switch. The reception signals input to the second photodetectors $212_1$ to $212_4$ serve as output signals $213_1$ to $213_4$ input to the terminals $241_1$ to $241_4$ of the first group, thus performing reverse signal transmission.

A shutter of the third row and the first column of the shutter array 204 is taken as an example. When a signal passes through this shutter, bidirectional communication between the terminal $241_1$ of the first group and the terminal $249_3$ of the second group is achieved. Bidirectional communication between a pair of terminals of the first and second groups can be achieved through each of other shutters.

The present invention is not limited to the particular embodiments described above, and various changes and modifications may be made. For example, a light exit end of an optical fiber bundle for transmitting an optical signal from another apparatus may be arranged in place of an LED or the like as a light source. In addition, a photodetector need not perform photoelectric conversion. For example, a light incident end of the optical fiber bundle for guiding an optical signal to the next apparatus may be used.

In the above embodiments, the shutter array is of a transmission type. However, a reflection type shutter array for selectively reflecting beams from light sources to photodetectors arranged in a specific direction may be used. Such a reflection type shutter array can be formed by a known method using a liquid crystal, GaAs, or the like.

Although the present invention has been described with reference to the particular embodiments, various changes and modifications which are obvious to a person skilled in the art to which the invention pertains are deemed to be incorporated without departing the spirit and scope of the invention.

What is claimed is:

1. An optical switch array comprising:
   a shutter array comprising $M \times N$ shutters capable of being individually opened and closed, said shutter array being arranged in a matrix form of M rows $\times$ N columns, where M is an integer of 2 or more and N is an integer of 2 or more, said shutter array having first and second sides;
   first light-emitting means disposed at a first side or said shutter array, said first light-emitting means comprising M light sources for respectively illuminating each row of said shutter array;
   second light-emitting means disposed at the first side of said shutter array, said second light-emitting means comprising N light sources for respectively illuminating each column of said shutter array;
   first light receiving means disposed at a second side of said shutter array, said first light receiving means comprising M photodetectors each of which receives a light emitted from said second light-emitting means and transmitted through a respective row of said shutter array; and
   second light receiving means disposed at the second side of said shutter array, said second light receiving means comprising N photodetectors each of which receives a light emitted from said first light-emitting means and transmitted through a respective column of said shutter array.

2. An optical switch array according to claim 1, wherein each light source of said first light-emitting means corresponds to a plurality of shutters constituting each respective row of said shutter array, and each light source of said second light-emitting means corresponds to a plurality of shutter constituting each respective column of said shutter array.

3. An optical switch array according to claim 1, wherein each photodetector of said first light receiving means corresponds to a plurality of shutters constituting each respective row of said shutter array, and each photodetector of said second light receiving means corresponds to a plurality of shutters constituting each respective column of said shutter array.

4. An optical switch array according to claim 1 further comprising:
   first anamorphic optical system for guiding a light emitted from said first light-emitting means to said shutter array;
   second anamorphic optical system for guiding a light emitted from said second light-emitting means to said shutter array; and
   a beam splitter for synthesizing the light emitted from said first light-emitting means and the light emitted from said second light-emitting means.

5. An optical switch array according to claim 4, wherein said first and second anamorphic optical systems comprise a spherical lens and a cylindrical lens, respectively.

6. An optical switch array according to claim 4, wherein said first light-emitting means emits light, a polarized state of which is different from that of light emitted from said second light-emitting means, and said beam splitter comprises a polarizing beam splitter.

7. An optical switch array according to claim 4, wherein said first light-emitting means emits light, a wavelength of which is different from that of light emitted from said second light-emitting means, and said beam splitter comprises a spectral beam splitter.

8. An optical switch array according to claim 1, further comprising:
- a beam splitter for splitting a light passed through said shutter array;
- first anamorphic optical system for guiding a light emitted from said first light-emitting means and passed through said shutter array to said second light receiving means; and
- second anamorphic optical system for guiding a light emitted from said second light-emitting means and passed through said shutter array to said first light receiving means.

9. An optical switch array according to claim 8, wherein said first and second anamorphic optical systems comprise a spherical lens and a cylindrical lens, respectively.

10. An optical switch array according to claim 8, wherein said first light-emitting means emits light, a polarized state of which is different from that of light emitted from said second light-emitting means, and said beam splitter comprises a polarizing beam splitter.

11. An optical switch array according to claim 8, wherein said first light-emitting means emits light, a wavelength of which is different from that of light emitted from said second light-emitting means, and said beam splitter comprises a spectral beam splitter.

12. An optical signal transmitting system comprising:
- a first terminal group comprising M terminals capable of receiving and transmitting signals, where M is an integer of 2 or more;
- a second terminal group comprising N terminals capable of receiving and transmitting signals, wherein N is an integer of 2 or more;
- a shutter array comprising M×N shutters capable of being individually opened and closed, arranged in a matrix of M rows×N columns, said shutter array having first and second sides;
- first light-emitting means disposed at a first side of said shutter array, said first light-emitting means comprising M light sources which are driven according to signals inputted from said M terminals of said first terminal group, said M light sources respectively illuminating each row of said shutter array;
- second light-emitting means disposed at the first side of said shutter array, said second light-emitting means comprising N light sources which are driven according to signals inputted from said N terminals of said second terminal group, said N light sources respectively illuminating each column of said shutter array;
- first light receiving means disposed at a second side of said shutter array, said first light receiving means comprising M photodetectors each of which receives a light emitted from said second light-emitting means and passed through a respective row of said shutter array, said M photodetectors respectively outputting signals to said M terminals of said first terminal group; and
- second light receiving means disposed at the second side of said shutter array, said second light receiving means comprising N photodetectors each of which receives a light emitted from said first light-emitting means and passed through a respective column of said shutter array, said N photodetectors respectively outputting signals to said N terminals of said second terminal groups.

13. A system according to claim 12, wherein each light source of said first light-emitting means corresponds to a plurality of shutters constituting each respective row of said shutter array, and each light source of said second light-emitting means corresponds to a plurality of shutters constituting each respective each respective column of said shutter array.

14. A system according to claim 12, wherein each photodetector of said first light receiving means corresponds to a plurality of shutters constituting each row of said shutter array, and each photodetector of said second light receiving means corresponds to a plurality of shutters constituting each respective column of said shutter array.

15. A system according to claim 12, further comprising:
- a first anamorphic optical system for guiding a light emitted from said first light-emitting means to said shutter array;
- a second anamorphic optical system for guiding a light emitted from said second light-emitting means to said shutter array; and
- a beam splitter for synthesizing the light emitted from said first light-emitting means and the light emitted from said second light-emitting means.

16. A system according to claim 15, wherein said first and second anamorphic optical system comprise a spherical lens and a cylindrical lens, respectively.

17. A system according to claim 15, wherein said first light-emitting means emits light, a polarized state of which is different from that of light emitted from said second light-emitting means, and said beam splitter comprises a polarizing beam splitter.

18. A system according to claim 15, wherein said first light-emitting means emits light, a wavelength of which is different from that of light emitted from said second light-emitting means, and said beam splitter comprises a spectral beam splitter.

19. A system according to claim 12, further comprising;
- a beam splitter for splitting a light passed through said shutter array;
- first anamorphic optical system for guiding a light emitted from said first light-emitting means and passed through said shutter array to said second light receiving means; and
- second anamorphic optical system for guiding a light emitted from said second light-emitting means and passed through said shutter array to said first light receiving means.

20. A system according to claim 19, wherein said first and second anamorphic optical systems comprise a spherical lens and a cylindrical leans, respectively.

21. A system according to claim 19, wherein said first light-emitting means emits light, a polarized state of which is different from that of light emitted from said second light-emitting means, and said beam splitter comprises a polarizing beam splitter.

22. A system according to claim 19, wherein said first light-emitting means emits light, a wavelength of which is different from that of light emitted from said second light-emitting means, and said beam splitter comprises a spectral beam splitter.

23. An optical switch array comprising:

a shutter array comprising M×N shutters capable of being individually opened and closed, arranged in a matrix form of M rows×N columns, where M is an integer of 2 or more and N is an integer of 2 or more, said shutter array having first and second sides;

first light-emitting means disposed at a first side or said shutter array, said first light-emitting means comprising M light sources each of which illuminates a half region of a respective column of said shutter array;

second light-emitting means disposed at a second side of said shutter array, said second light-emitting means comprising N light sources each of which illuminates a half region of a respective row of said shutter array;

first light receiving means disposed at the first side of said shutter array, said first light which receives a light emitted from said second light-emitting means and transmitted through the other half region of each respective row of said shutter array; and second light receiving means disposed at the second side of said shutter array, said second light receiving means comprising N photodetectors each of which receives a light emitted from said first light-emitting means and transmitted through the other half region of each respective column of said shutter array.

24. An optical switch array according to claim 23, wherein the opening or closing of said shutters is conducted such that a plurality of shutters are opened or closed as one unit, and said optical switch array further comprises a mask on which a predetermined pattern of light transmitting or reflecting regions is repeatedly formed every said unit.

25. An optical switch array according to claim 23 further comprising:
a first anamorphic optical system for guiding a light emitted from said first light-emitting means to said shutter array and also for guiding a light emitted from said second light-emitting means and transmitted through said shutter array to said first light receiving means; and
a second anamorphic optical system for guiding a light emitted from said second light-emitting means to said shutter array and also for guiding a light emitted from said first light-emitting means and transmitted through said shutter array to said second light receiving means.

26. An optical switch array according to claim 25, wherein said first and second anamorphic optical systems comprise a spherical lens and a cylindrical lens, respectively.

27. An optical switch array according to claim 23, wherein said first light-emitting means and said first light receiving means are disposed close in contact with each other at the first side of said shutter array and have the same size as said shutter array, and said second light-emitting means and said second light receiving means are provided tightly in contact with each other at the second side of said shutter array and have the same size as said shutter array.

28. An optical signal transmitting system comprising:
a first terminal group comprising M terminals capable of receiving and transmitting signals, where m is an integer of 2 or more;
a second terminal group comprising N terminals capable of receiving and transmitting signals, wherein N is an integer of 2 or more;
a shutter array comprising M×N shutters capable of being individually opened and closed, arranged in a matrix of M rows×N columns, said shutter array having first and second sides;
first light-emitting means disposed at a first side of said shutter array, said first light-emitting means comprising M light sources each of which illuminates a half region of each respective row of said shutter array, said M light sources being driven according to signals inputted from said M terminals of said first terminal group;
second light-emitting means disposed at a second side of said shutter array, said second light-emitting means comprising N light sources each of which illuminates a half region of a respective row of said shutter array, said N light sources being driven according to signals inputted from said N terminals of said second terminal group;
first light receiving means disposed at the first side of said shutter array, said first light receiving means comprising M photodetectors each which receives a light emitted from said second light-emitting means and transmitted through the other half region of each respective row of said shutter array, said M photodetectors respectively outputting signals to said M terminals of said first terminal group; and
second light receiving means disposed at the second side of said shutter array, said second light receiving means comprising N photodetectors each of which receives a light emitted from said first light-emitting means and transmitted through the other half region of each respective column of said shutter array, said N photodetectors respectively outputting signals to said N terminals of said second terminal group.

29. A system according to claim 28, wherein the opening or closing of said shutters is conducted such that a plurality of shutters are opened or closed as one unit, and said optical switch array further comprises a mask on which a predetermined pattern of light transmitting or reflecting regions is repeatedly formed every said unit.

30. A system according to claim 28, further comprising:
a first anamorphic optical system for guiding a light emitted from said first light-emitting means to said shutter array and also for guiding a light emitted from said second light-emitting means and transmitted through said shutter array to said first light receiving means; and
a second anamorphic optical system for guiding a light emitted from said second light-emitting means to said shutter array and also for guiding a light emitted from said first light-emitting means and transmitted through said shutter array to said second light receiving means.

31. A system according to claim 30, wherein said first and second anamorphic optical systems comprise a spherical lens and a cylindrical lens, respectively.

32. A system according to claim 31, wherein said first and second anamorphic optical systems comprise a spherical lens and a cylindrical lens, respectively.

33. A system according to claim 28, wherein said first light-emitting means and said first light receiving means are disposed in close contact with each other at the first side of said shutter array and have the same size as said shutter array, and second light-emitting means and said second light receiving means are provided tightly in contact with each other and have the same size as said shutter array.

34. An optical switch array comprising:

a shutter array comprising M×N shutters capable of being individually opened and closed, arranged in a matrix of M rows×N columns, where M is an integer of 2 or more and N is an integer of 2 or more, said shutter array having first and second sides;

a first light-emitting means disposed at a first side of said shutter array, said first light-emitting means comprising M light sources each of which illuminates a respective row of said shutter array;

second light-emitting means disposed at a second side of said shutter array, said second light-emitting means comprising N light sources each of which illuminates a respective column of said shutter array;

first light receiving means disposed at the first side of said shutter array, and first light receiving means comprising M photodetectors each of which receives a light emitted from said second light-emitting means and transmitted through each respective row of said shutter array, said M photodetectors and said M light sources of said first light-emitting means being arranged parallel to each other at a position optically shifted with respect to said shutter array; and second light receiving means disposed at the second side of said shutter array, said second light receiving means comprising N photodetectors each of which receives a light emitted from said first light-emitting means and transmitted through each respective column of said shutter array, said N photodetectors and said N light sources of said second light-emitting means being arranged parallel to each other at a position optically shifted with respect to said shutter array.

35. An optical switch array according to claim 34, wherein the opening or closing of said shutters is conducted such that a plurality of shutters are opened or closed as one unit, and said optical switch array further comprises a mask on which a predetermined pattern of light transmitting or reflecting regions is repeatedly formed every said unit.

36. An optical switch array according to claim 34 further comprising:

a first anamorphic optical system for guiding a light emitted from said first light-emitting means to said shutter array and also for guiding a light emitted from said second light-emitting means and transmitted through said shutter array to said first light receiving means; and a second anamorphic optical system for guiding a light emitted from said second light-emitting means to said shutter array and also for guiding a light emitted from said first light-emitting means and transmitted through said shutter array to said second light receiving means.

37. An optical switch array according to claim 36, wherein said first and second anamorphic optical systems comprise a spherical lens and a cylindrical lens, respectively.

38. An optical signal transmitting system comprising:

a first terminal group comprising M terminals capable of receiving and transmitting signals, where M is an integer of 2 or more;

a second terminal group comprising N terminals capable of receiving and transmitting signals, wherein N is an integer of 2 or more;

a shutter array comprising M×N shutters capable of being individually opened and closed, arranged in a matrix form of M rows×N columns, said shutter array having first and second sides;

first light-emitting means disposed at a first side of said shutter array, said first light-emitting means comprising M light sources each of which illuminates a respective row of said shutter array, said M light sources being driven according to signals inputted from said M terminals group;

second light-emitting means disposed at a second side of said shutter array, said second light-emitting means comprising N light sources each of which illuminates a respective column of said shutter array, said N light sources being driven according to signals inputted from said N terminals of said second terminal group;

first light receiving means disposed at the first side of said shutter array, and first light receiving means comprising M photodetectors each of which receives a light emitted from said second light-emitting means and transmitted through each respective row of said shutter array, said M photodetectors and said M light sources of said first light-emitting means being arranged parallel to each other at a position optically shifted with respect to said shutter array, said M photodetectors respectively outputting signals to said M terminals of said first terminal group; and second light receiving means disposed at the second side of said shutter array, said second light receiving means comprising N photodetectors each of which receives a light emitted from said first light-emitting means and transmitted through each respective column of said shutter array, said N photodetectors and said N light sources of said second light-emitting means being arranged parallel to each other at a position optically shifted with respect to said shutter array, said N photodetectors respectively outputting signals to said N of terminals of said second terminal group.

39. A system according to claim 38, wherein the opening or closing of said shutters is conducted such that a plurality of shutters are opened or closed as one unit, and said optical switch array further comprises a mask on which a predetermined pattern of light transmitting or reflecting regions is repeatedly formed every said unit.

40. A system according to claim 38, further comprising:

a first anamorphic optical system for guiding a light emitted from said first light-emitting means to said shutter array and also for guiding a light emitted from said second light-emitting means and transmitted through said shutter array to said first light receiving means; and a second anamorphic optical system for guiding a light emitted from said second light-emitting means to said shutter array and also for guiding a light emitted from said first light-emitting means and transmitted through said shutter array to said second light receiving means.

41. An optical switch array for connecting a first group of M terminals, wherein M is an integer of not less than 1, capable of transmitting and receiving signals to and from a second group of N terminals, wherein N is an integer of not less than 1, comprising:

first light-emitting means arranged in a first direction and consisting of M light sources driven in response to the signals input from said first group of terminals;

second light-emitting means arranged in the first direction and consisting of N light sources driven in response to signals input from said second group of terminals;

first light-receiving means arranged in a second direction perpendicular to the first direction and consisting of M photodetectors for outputting the signals to said first group of terminals, said first light-receiving means receiving a beam emitted from said second light-emitting means;

second light-receiving means arranged in the second direction and consisting of N photodetectors for outputting the signals to said second group of terminals, said second light-receiving means receiving a beam emitted from said first light-emitting means;

a shutter array arranged in optical paths extending from said first and second light-emitting means to said first and second light-emitting means, said shutter array comprising M×N openable shutters arranged in a matrix form;

first optical means for guiding beams from said first and second light-emitting means to said shutter array;

a first anamorphic optical system for keeping said first light-emitting means and said shutter array in a conjugate relationship in the first direction and for locating said first light-emitting means at a front focal position of said first anamorphic optical system in the second direction;

a second anamorphic optical system for keeping said second light-emitting means and said shutter array in a conjugate relationship in the second direction and for locating said second light-emitting means at a front focal position of said second anamorphic optical system in the first direction; and a first beam splitter for synthesizing the beam emitted from said first light-emitting means with the beam emitted from said second light-emitting means and guiding a synthesized beam to said shutter array, wherein said first and second light-emitting means emit beams polarized in different directions, and said first beams splitter comprises a polarizing beam splitter.

42. An optical switch array for connecting a first group of M terminals, wherein M is an integer of not less than 1, capable of transmitting and receiving signals to and from a second group of N terminals, wherein N is an integer of not less than 1, comprising:

first light-emitting means arranged in a first direction and consisting of M light sources driven in response to the signals input from said first group of terminals;

second light-emitting means arranged in the first direction and consisting of N light sources driven in response to signals input from said second group of terminals;

first light-receiving means arranged in a second direction perpendicular to the first direction and consisting of M photodetectors for outputting the signals to said first group of terminals, said first light-receiving means receiving a beam emitted from said second light-emitting means;

second light-receiving means arranged in the second direction and consisting of N photodetectors for outputting the signals to said second group of terminals, said second light-receiving means receiving a beam emitted from said first light-emitting means;

a shutter array arranged in optical paths extending from said first and second light-emitting means to said first and second light-emitting means, said shutter array comprising M×N openable shutters arranged in a matrix form;

first optical means for guiding beams from said first and second light-emitting means to said shutter array;

a first anamorphic optical system for keeping said first light-emitting means and said shutter array in a conjugate relationship in the first direction and for locating said first light-emitting means at a front focal position of said first anamorphic optical system in the second direction;

a second anamorphic optical system for keeping said second light-emitting means and said shutter array in a conjugate relationship in the second direction and for locating said second light-emitting means at a front focal position of said second anamorphic optical system in the first direction; and a first beam splitter for synthesizing the beam emitted from said first light-emitting means with the beam emitted from said second light-emitting means and guiding a synthesized beam to said shutter array, wherein said first and second light-emitting means emit beams having different wavelengths, and said first beam splitter comprises a spectral beam splitter.

43. An optical switch array for connecting a first group of M terminals, wherein M is an integer of not less than 1, capable of transmitting and receiving signals to and from a second group of N terminals, wherein N is an integer of not less than 1, comprising:

first light-emitting means arranged in a first direction and consisting of M light sources driven in response to the signals input from said first group of terminals;

second light-emitting means arranged in the first direction and consisting of N light sources driven in response to signals input from said second group of terminals;

first light-receiving means arranged in a second direction perpendicular to the first direction and consisting of M photodetectors for outputting the signals to said first group of terminals, said first light-receiving means receiving a beam emitted from said second light-emitting means;

second light-receiving means arranged in the second direction and consisting of N photodetectors for outputting the signals to said second group of terminals, said second light-receiving means receiving a beam emitted from said first light-emitting means;

a shutter array arranged in optical paths extending from said first and second light-emitting means to said first and second light-emitting means, said shutter array comprising M×N openable shutters arranged in a matrix form;

optical means for guiding beams from said shutter array to said first and second light-receiving means;

a first anamorphic optical system for keeping said second light-receiving means and said shutter array in a conjugate relationship in the second direction and for locating said second light-emitting means at a rear focal position of said first anamorphic optical system in the first direction;

a second anamorphic optical system for keeping said first light-emitting means and said shutter array in a conjugate relationship in the first direction and for locating said first light-emitting means at a rear focal position of said second anamorphic optical system in the second direction; and a beam splitter for splitting the beam having passed through said shutter array and guiding split beams to said first and second light-receiving means, wherein said first and second light-emitting means emit beams polarized in different directions, and said beam splitter comprises a polarizing beam splitter.

44. An optical switch array for connecting a first group of M terminals, wherein M is an integer of not less than 1, capable of transmitting and receiving signals to and from a second group of N terminals, wherein N is an integer of not less than 1, comprising:

first light-emitting means arranged in a first direction and consisting of M light sources driven in response to the signals input from said first group of terminals;

second light-emitting means arranged in the first direction and consisting of N light sources driven in response to signals input from second group of terminals;

first light-receiving means arranged in a second direction perpendicular to the first direction and consisting of M photodetectors for outputting the signals to said first group of terminals, said first light-receiving means receiving a beam emitted from said second light-emitting means;

second light-receiving means arranged in the second direction and consisting of N photodetectors for outputting the signals to said second group of terminals, said second light-receiving means receiving a beam emitted from said first light-emitting means;

a shutter array arranged in optical paths extending from said first and second light-emitting means to said first and second light-emitting means, said shutter array comprising M×N openable shutters arranged in a matrix form;

optical means for guiding beams from said shutter array to said first and second light-receiving means;

a first anamorphic optical system for keeping said second light-receiving means and said shutter array in a conjugate relationship in the second direction and for locating said second light-emitting means at a rear focal position of said first anamorphic optical system in the first direction;

a second anamorphic optical system for keeping said first light-emitting means and said shutter array in a conjugate relationship in the first direction and for locating said first light-emitting means at a rear focal position of said second anamorphic optical system in the second direction; and a beam splitter for splitting the beam having passed through said shutter array and guiding split beams to said first and second light-receiving means, wherein said first and second light-emitting means emit beams polarized in different directions, and said beam splitter comprises a spectral beam splitter.

45. An optical signal transmission system comprising:

a first group consisting of M terminals, wherein M is an integer of not less than 1, capable of transmitting and receiving signals;

a second group consisting of N terminals, wherein N is an integer of not less than 1, capable of transmitting and receiving signals;

first light-emitting means arranged in a first direction and consisting of M light sources driven in response to the signals input from the first group of terminals;

second light-emitting means arranged in the first direction and consisting of N light sources driven in response to the signals input from the terminals of second group;

first light-receiving means arranged in a second direction perpendicular to the first direction and consisting of m photodetectors for outputting the signals to said first group of terminals, said first light-receiving means receiving a beam emitted from said second light-emitting means;

second light-receiving means arranged in the second direction and consisting of N photodetectors for outputting the signals to said second group of terminals, said second light-receiving means receiving a beam emitted from said first light-emitting means;

a shutter array arranged in optical paths extending from said first and second light-emitting means to said first and second light-emitting means, said shutter array comprising M×N openable shutters arranged in a matrix form;

first optical means for guiding beams from said first and second light-emitting means to said shutter array;

a first anamorphic optical system for keeping said first light-emitting means and said shutter array in a conjugate relationship in the first direction and for locating said first light-emitting means at a front focal position of said first anamorphic optical system in the second direction;

a second anamorphic optical system for keeping said second light-emitting means and said shutter array in a conjugate relationship in the second direction and for locating said second light-emitting means at a front focal position of said second anamorphic optical system in the first direction; and a first beam splitter for synthesizing the beam emitted from said first light-emitting means with the beam emitted from said second light-emitting means and guiding a synthesized beam to said shutter array, wherein said first and second light-emitting means emit beams polarized in different directions, and said first beams splitter comprises a polarizing beam splitter.

46. An optical signal transmission system comprising:

a first group consisting of M terminals, wherein M is an integer of not less than 1, capable of transmitting and receiving signals;

a second group consisting of N terminals, wherein N is an integer of not less than 1, capable of transmitting and receiving signals;

first light-emitting means arranged in a first direction and consisting of M light sources driven in response to the signals input from the first group of terminals;

second light-emitting means arranged in the first direction and consisting of N light sources driven in response to the signals input from the terminals of second group;

first light-receiving means arranged in a second direction perpendicular to the first direction and consisting of m photodetectors for outputting the signals to said first group of terminals, said first light-receiving means receiving a beam emitted from said second light-emitting means;

second light-receiving means arranged in the second direction and consisting of N photodetectors for outputting the signals to said second group of terminals, said second light-receiving means receiving a beam emitted from said first light-emitting means;

a shutter array arranged in optical paths extending from said first and second light-emitting means to said first and second light-emitting means, said shutter array comprising M×N openable shutters arranged in a matrix form;

first optical means for guiding beams from said first and second light-emitting means to said shutter array;

a first anamorphic optical system for keeping said first light-emitting means and said shutter array in a conjugate relationship in the first direction and for locating said first light-emitting means at a front focal position of said first anamorphic optical system in the second direction;

a second anamorphic optical system for keeping said second light-emitting means and said shutter array in a conjugate relationship in the second direction and for locating said second light-emitting means at a front focal position of said second anamorphic optical system in the first direction; and a first beam splitter for synthesizing the beam emitted from said first light-emitting means with the beam emitted from said second light-emitting means and guiding a synthesized beam to said shutter array, wherein said first and second light-emitting means emit beams polarized in different wavelengths, and said first beams splitter comprises a spectral beam splitter.

47. An optical signal transmission system comprising:
a first group consisting of M terminals, wherein M is an integer of not less than 1, capable of transmitting and receiving signals;

a second group consisting of N terminals, wherein N is an integer of not less than 1, capable of transmitting and receiving signals;

first light-emitting means arranged in a first direction and consisting of M light sources driven in response to the signals input from the first group of terminals;

second light-emitting means arranged in the first direction and consisting of N light sources driven in response to the signals input from the terminals of second group;

first light-receiving means arranged in a second direction perpendicular to the first direction and consisting of m photodetectors for outputting the signals to said first group of terminals, said first light-receiving means receiving a beam emitted from said second light-emitting means;

second light-receiving means arranged in the second direction and consisting of N photodetectors for outputting the signals to said second group of terminals, said second light-receiving means receiving a beam emitted from said first light-emitting means;

a shutter array arranged in optical paths extending from said first and second light-emitting means to said first and second light-emitting means, said shutter array comprising M×N openable shutters arranged in a matrix form;

optical means for guiding beams from said shutter array to said first and second light-receiving means;

a first anamorphic optical system for keeping said second light-receiving means and said shutter array in a conjugate relationship in the second direction and for locating said second light-emitting means at a rear focal position of said first anamorphic optical system in the first direction;

a second anamorphic optical system for keeping said first light-emitting means and said shutter array in a conjugate relationship in the first direction and for locating said first light-emitting means at a rear focal position of said second anamorphic optical system in the second direction; and a beam splitter for splitting the beam having passed through said shutter array and guiding split beams to said first and second light-receiving means, wherein said first and second light-emitting means emit beams polarized in different directions, and said beam splitter comprises a polarized beam splitter.

48. An optical signal transmission system comprising:
a first group consisting of M terminals, wherein M is an integer of not less than 1, capable of transmitting and receiving signals;

a second group consisting of N terminals, wherein N is an integer of not less than 1, capable of transmitting and receiving signals;

first light-emitting means arranged in a first direction and consisting of M light sources driven in response to the signals input from the first group of terminals;

second light-emitting means arranged in the first direction and consisting of N light sources driven in response to the signals input from the terminals of second group;

first light-receiving means arranged in a second direction perpendicular to the first direction and consisting of m photodetectors for outputting the signals to said first group of terminals, said first light-receiving means receiving a beam emitted from said second light-emitting means;

second light-receiving means arranged in the second direction and consisting of N photodetectors for outputting the signals to said second group of terminals, said second light-receiving means receiving a beam emitted from said first light-emitting means;

a shutter array arranged in optical paths extending from said first and second light-emitting means to said first and second light-emitting means, said shutter array comprising M×N openable shutters arranged in a matrix form;

optical means for guiding beams from said shutter array to said first and second light-receiving means;

a first anamorphic optical system for keeping said second light-receiving means and said shutter array in a conjugate relationship in the second direction and for locating said second light-emitting means at a rear focal position of said first anamorphic optical system in the first direction;

a second anamorphic optical system for keeping said first light-emitting means and said shutter array in a conjugate relationship in the first direction and for locating said first light-emitting means at a rear focal position of said second anamorphic optical system in the second direction; and a beam splitter for splitting the beam having passed through said shutter array and guiding split beams to said first and second light-receiving means, wherein said first and second light-emitting means emit beams polarized in different wavelengths, and said beam splitter comprises a spectral beam splitter.

* * * * *

UNITED STATES PATENT AND TRADEMARK OFFICE
CERTIFICATE OF CORRECTION

PATENT NO. : 5,227,906
DATED : July 13, 1993
INVENTOR(S) : JUN TOKUMITSU

It is certified that error appears in the above-indentified patent and that said Letters Patent is hereby corrected as shown below:

COLUMN 2
    Line 66, "t" should read --to.--.

COLUMN 4
    Line 28, "$49_8$" should read --$49_8$.--.

COLUMN 5
    Line 26, "513" should read --$51_3$--.
    Line 32, "Beam" should read "Beams--.

COLUMN 6
    Line 31, "lecated" should read --located--.
    Line 37, "almost" should read --almost at --.

COLUMN 8
    Line 62, "light sources $11_1$," should read --light sources 111,--.

COLUMN 9
    Line 7, "light sources 11," should read --light sources 111,--.
    Line 12, "$11_1$." should read --111.--.
    Line 28, "ar" should read --are--.
    Line 55, "tot he" should read --to the--.
    Line 59, "tot he" should read --to the--.

UNITED STATES PATENT AND TRADEMARK OFFICE
CERTIFICATE OF CORRECTION

PATENT NO. : 5,227,906
DATED : July 13, 1993
INVENTOR(S) : JUN TOKUMITSU

It is certified that error appears in the above-indentified patent and that said Letters Patent is hereby corrected as shown below:

COLUMN 10
    Line 35, "is" should read --are--.

COLUMN 12
    Line 29, "signal line $\lambda$" should read --signal line $\ell$--.
    Line 30, "$\lambda$th" should read --$\ell$th--.
    Line 63, "$\lambda$th" should read --$\ell$th--.
    Line 65, "$\{4(k-1)+\lambda\}$th" should read --$\{4(k-1)+\ell\}$th --.

COLUMN 14
    Line 18, "$\{4(k-1)+\lambda\}$th" should read --$\{4(k-1)+\ell\}$th --.
    Line 19, "(th" should read --$\ell$th--

COLUMN 17
    Line 25, "belong" should read --to belong--.
    Line 31, "are" should read --is--.

COLUMN 19
    Line 20, "not almost" should read --almost not--.

COLUMN 20
    Line 5, departing" should read -- departing from--.
    Line 15, "or" should read --of--.
    Line 40, "shutter" should read --shutters--.

UNITED STATES PATENT AND TRADEMARK OFFICE
CERTIFICATE OF CORRECTION

PATENT NO. : 5,227,906
DATED : July 13, 1993
INVENTOR(S) : JUN TOKUMITSU

It is certified that error appears in the above-indentified patent and that said Letters Patent is hereby corrected as shown below:

COLUMN 22
Line 10, "each respective" should be deleted.
Line 57, "leans," should read --lens,--.

COLUMN 23
Line 67, "m" should read --M--.

COLUMN 24
Line 45, "formed every" should read --formed for every--.

COLUMN 26
Line 46, "Said N of" should read --said N--.

COLUMN 27
Line 51, "beams" should read --beam--.

COLUMN 28
Line 11, "light-emitting means," should read --light receiving means,--.
Line 64, "light-emitting means," should read --light receiving means,--.

UNITED STATES PATENT AND TRADEMARK OFFICE
CERTIFICATE OF CORRECTION

PATENT NO. : 5,227,906
DATED : July 13, 1993
INVENTOR(S) : JUN TOKUMITSU

It is certified that error appears in the above-indentified patent and that said Letters Patent is hereby corrected as shown below:

COLUMN 30
    Line 31, "light-emitting means," should read --light-receiving means,--.

COLUMN 31
    Line 18, "light-emitting means," should read --light-receiving means,--.
    Line 41, "polarized" should read --having--.
    Line 62, "m" should read --M--.

COLUMN 32
    Line 13, "light-emitting" should read --light receiving--.
    Line 19, "light-emitting" should read --light receiving--.
    Line 27, "polarized" should read --polarizing--.
    Line 58, "light-emitting" should read --light-receiving--.
    Line 66, "light-emitting" should read --light-receiving--.

UNITED STATES PATENT AND TRADEMARK OFFICE
CERTIFICATE OF CORRECTION

PATENT NO. : 5,227,906
DATED : July 13, 1993
INVENTOR(S) : JUN TOKUMITSU

It is certified that error appears in the above-indentified patent and that said Letters Patent is hereby corrected as shown below:

COLUMN 33
    Line 4, "light-emitting" should read --light-receiving--.

COLUMN 34
    Line 4, "polarized in" should read --having--.

Signed and Sealed this

Seventeenth Day of May, 1994

Attest:

BRUCE LEHMAN

*Attesting Officer*      *Commissioner of Patents and Trademarks*